(12) United States Patent
Lawrenson et al.

(10) Patent No.: US 10,663,303 B2
(45) Date of Patent: May 26, 2020

(54) SYSTEM AND METHOD FOR DYNAMICALLY AUTHENTICATING MAP DATA USING BLOCKCHAINS

(71) Applicant: PANASONIC INTELLECTUAL PROPERTY MANAGEMENT CO., LTD., Osaka (JP)

(72) Inventors: Matthew John Lawrenson, Lausanne (CH); Julian Charles Nolan, Lausanne (CH); Norihiko Kobayashi, Tokyo (JP); Nobuhiro Fukuda, Kanagawa (JP); Makoto Hinata, Kanagawa (JP); Takanao Yano, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 16/002,682

(22) Filed: Jun. 7, 2018

(65) Prior Publication Data
US 2018/0356236 A1 Dec. 13, 2018

Related U.S. Application Data

(60) Provisional application No. 62/518,157, filed on Jun. 12, 2017.

(51) Int. Cl.
*G01C 21/30* (2006.01)
*H04L 29/08* (2006.01)
(Continued)

(52) U.S. Cl.
CPC ............ *G01C 21/30* (2013.01); *G01C 21/32* (2013.01); *G06F 16/23* (2019.01); *G06F 16/29* (2019.01);
(Continued)

(58) Field of Classification Search
CPC ......... G01C 21/30; G01C 21/32; G06F 16/23; G06F 16/29; H04L 9/0637; H04L 9/3239;
(Continued)

(56) References Cited

U.S. PATENT DOCUMENTS

| 8,736,463 B1 * | 5/2014 | Zhu .................... G06K 9/00791 340/933 |
| 9,221,396 B1 * | 12/2015 | Zhu .................... G06K 9/00791 |

(Continued)

FOREIGN PATENT DOCUMENTS

| EP | 3037314 A1 * | 6/2016 | .......... B60W 40/068 |
| WO | 2017/030911 | 2/2017 | |

(Continued)

OTHER PUBLICATIONS

International Search Report(PCT/ISA/210) dated Sep. 14, 2018 issued in the corresponding PCT applicationNo. PCT/JP2018/022487.

(Continued)

*Primary Examiner* — Calvin Cheung
(74) *Attorney, Agent, or Firm* — Greenblum & Bernstein, P.L.C.

(57) ABSTRACT

A system and method for updating map data for updating map data for an autonomous vehicle (AV) is provided. The method includes collecting, using one or a plurality of AV sensors of a first AV, sensor data, and comparing the sensor data collected against map data for determining a presence of potential changed data. The method further includes generating a proof of work (PoW) block including the potential changed data, and collecting, using one or a plurality of AV sensors of a second AV, first verification sensor data. The potential changed data is then compared with the first verification sensor data for generating a first verified map block based on the first verification sensor data, (Continued)

and adding the first verified map block to a first verified map blockchain.

27 Claims, 14 Drawing Sheets

(51) Int. Cl.
H04L 9/06 (2006.01)
G06F 16/23 (2019.01)
G06F 16/29 (2019.01)
H04L 29/06 (2006.01)
G01C 21/32 (2006.01)
H04L 9/32 (2006.01)

(52) U.S. Cl.
CPC .......... *H04L 9/0637* (2013.01); *H04L 9/3239* (2013.01); *H04L 9/3247* (2013.01); *H04L 63/00* (2013.01); *H04L 67/1097* (2013.01); *H04L 67/12* (2013.01); *H04L 2209/38* (2013.01); *H04L 2209/805* (2013.01); *H04L 2209/84* (2013.01)

(58) Field of Classification Search
CPC ... H04L 9/3247; H04L 63/00; H04L 67/1097; H04L 67/12; H04L 2209/38; H04L 2209/805; H04L 2209/84
See application file for complete search history.

(56) References Cited

U.S. PATENT DOCUMENTS

| | | | | |
|---|---|---|---|---|
| 9,612,123 | B1* | 4/2017 | Levinson | B60Q 1/525 |
| 9,623,905 | B2* | 4/2017 | Shashua | G01C 21/3644 |
| 9,719,801 | B1* | 8/2017 | Ferguson | G01C 25/00 |
| 9,832,241 | B1* | 11/2017 | Hayward | G01C 21/36 |
| 10,223,816 | B2* | 3/2019 | Dorum | G06T 11/20 |
| 10,324,463 | B1* | 6/2019 | Konrardy | B60W 50/082 |
| 10,486,485 | B1* | 11/2019 | Levinson | B60W 50/0098 |
| 2013/0006484 | A1* | 1/2013 | Avitzur | E02F 9/205 701/50 |
| 2014/0309833 | A1* | 10/2014 | Ferguson | G06K 9/00798 701/23 |
| 2015/0112537 | A1* | 4/2015 | Kawamata | G01C 21/34 701/23 |
| 2016/0137206 | A1* | 5/2016 | Chandraker | G06T 17/00 382/104 |
| 2016/0321278 | A1 | 11/2016 | Naqvi | |
| 2016/0357188 | A1* | 12/2016 | Ansari | G05D 1/0212 |
| 2017/0010617 | A1* | 1/2017 | Shashua | G01C 21/165 |
| 2017/0053460 | A1 | 2/2017 | Hauser et al. | |
| 2017/0192436 | A1* | 7/2017 | Min | G01C 21/34 |
| 2017/0359561 | A1* | 12/2017 | Vallespi-Gonzalez | G06T 7/593 |
| 2018/0004217 | A1* | 1/2018 | Biber | G05D 1/0274 |
| 2018/0004223 | A1* | 1/2018 | Baldwin | B60W 30/18154 |
| 2018/0025235 | A1* | 1/2018 | Fridman | G01C 21/28 382/103 |
| 2018/0188037 | A1* | 7/2018 | Wheeler | G01C 21/32 |
| 2018/0224284 | A1* | 8/2018 | Danford | G01C 21/32 |
| 2018/0224850 | A1* | 8/2018 | Kroop | G08G 1/096725 |
| 2018/0247467 | A1 | 8/2018 | Hauser et al. | |
| 2018/0345963 | A1* | 12/2018 | Maura | G06K 9/00798 |
| 2019/0025071 | A1* | 1/2019 | Fukui | G09B 29/00 |
| 2019/0078896 | A1* | 3/2019 | Zhu | G08G 1/0129 |

FOREIGN PATENT DOCUMENTS

| | | |
|---|---|---|
| WO | 2017/046805 | 3/2017 |
| WO | 2017/180382 | 10/2017 |

OTHER PUBLICATIONS

International Opinion of the International Searching Authority(PCT/ISA/237) dated Sep. 14, 2018 issued in the corresponding PCT applicationNo. PCT/JP2018/022487.
International Preliminary Report on Patentability (PCT/IB/373) dated Dec. 17, 2019 issued in the corresponding PCT applicationNo. PCT/JP2018/022487.

* cited by examiner

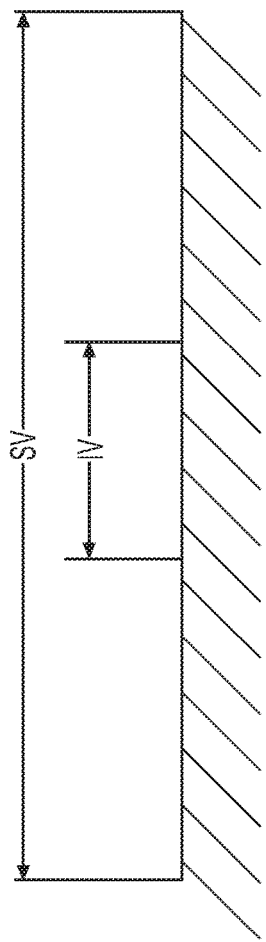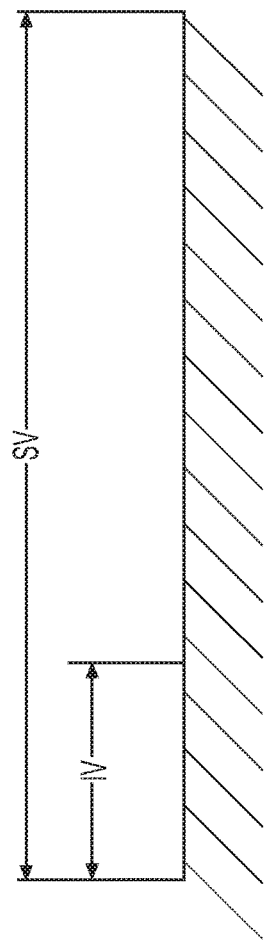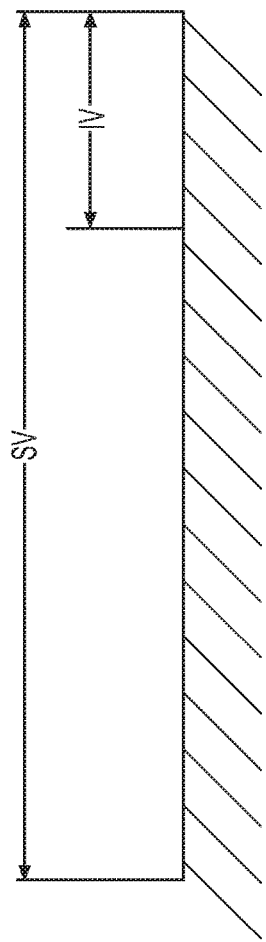

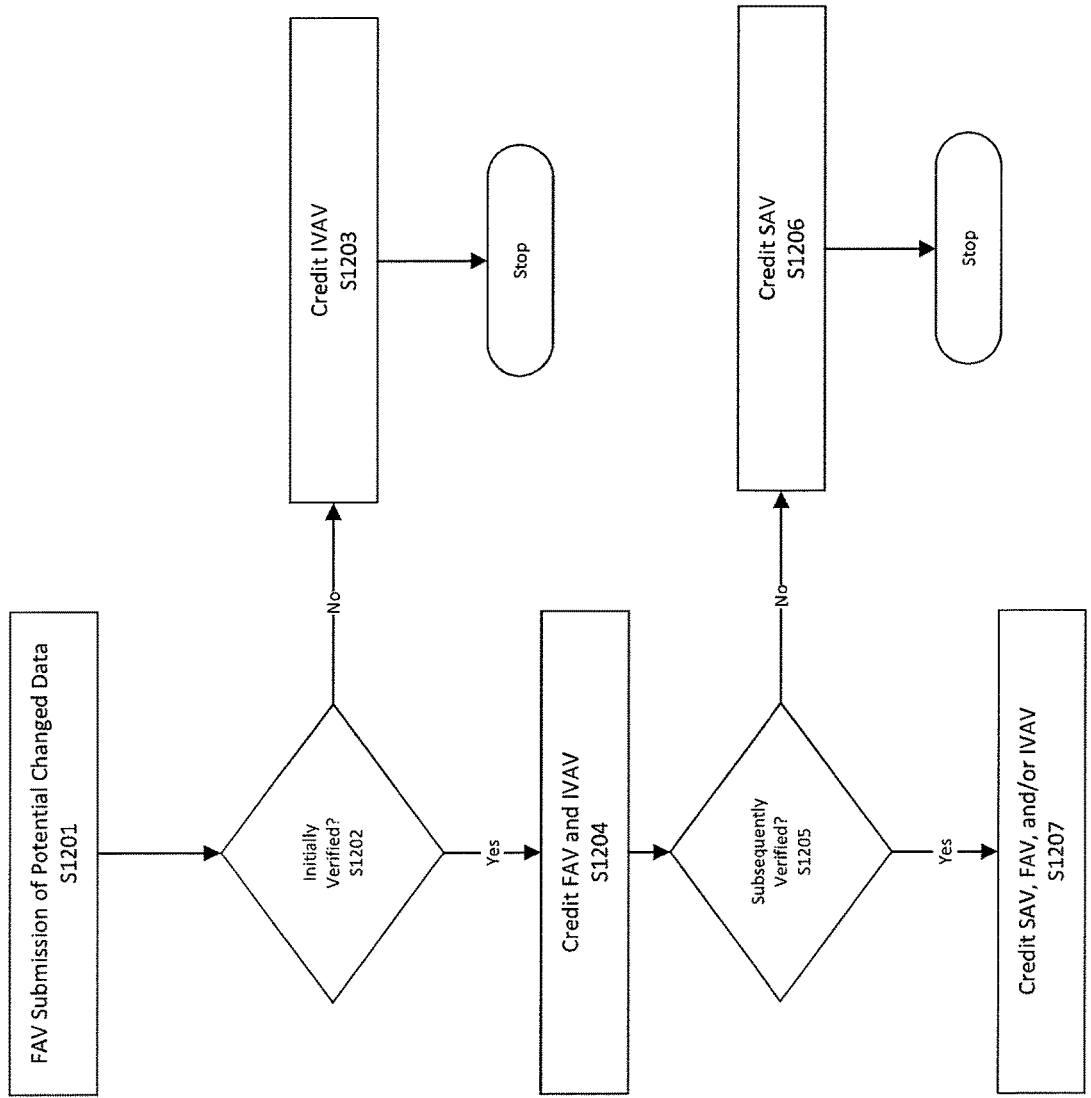

SYSTEM AND METHOD FOR DYNAMICALLY AUTHENTICATING MAP DATA USING BLOCKCHAINS

CROSS-REFERENCE TO RELATED APPLICATION(S)

The present application claims the benefit of U.S. Provisional Patent Application No. 62/518,157 filed on Jun. 12, 2017. The entire disclosure of the above-identified application, including the specifications, drawings and/or claims, is incorporated herein by reference in its entirety.

BACKGROUND

1. Field of the Disclosure

The present disclosure relates to an autonomous vehicles and corresponding map system. More particularly, the present disclosure relates to autonomous vehicles that are operated in accordance with map information provided by a map system.

2. Background Information

An autonomous vehicle (AVs) is a vehicle capable of sensing its location, details of its surrounding environment and navigating along a route without needing a human driver.

With regard to understanding location, systems such as GPS offer some location information, however have limited accuracy, with commercial GPS being accurate to within 4.9 m even with clear skies. Also, GPS may be often unreliable in certain environments. For example, in dense city areas, GPS signals may be blocked, or GPS signals may be affected by reflections from tall buildings. In urban canyons, the accuracy may be off by much as 50 m. Furthermore, GPS signals may be completely unavailable in tunnels or under bridges. However, AVs need to operate in all circumstances, even when GPS is not available.

BRIEF DESCRIPTION OF THE DRAWINGS

FIGS. 3A, 3B and 3C show exemplary configurations for which subsequent verification is performed with respect to initial verification, according to an aspect of the present disclosure;

FIG. 12 shows an exemplary method for crediting an AV, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
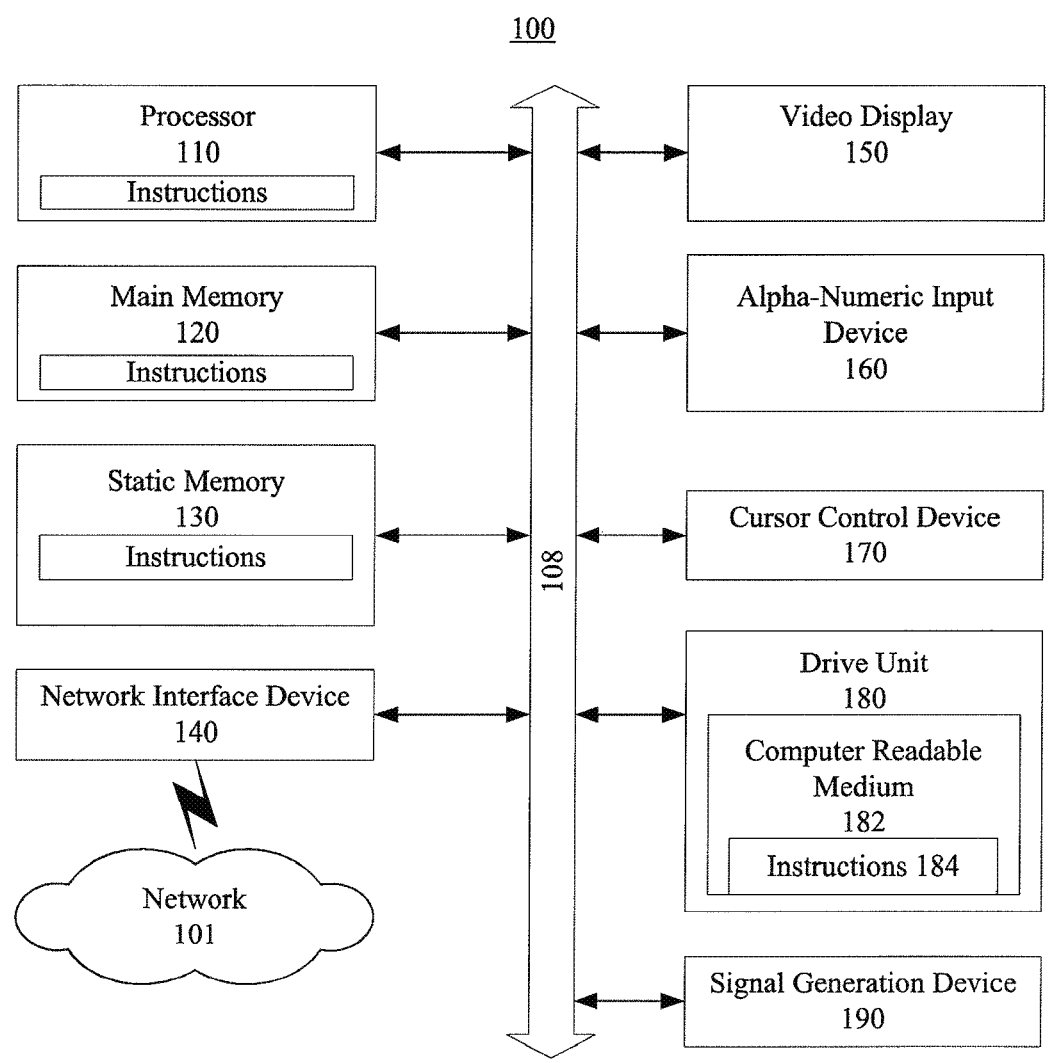
FIG. 1 shows an exemplary general computer system that is configured to update map data for an autonomous vehicle (AV), according to an aspect of the present disclosure.

FIG. 1 shows an exemplary general computer system that is configured to combine alphabet characters of differing languages, according to an aspect of the present disclosure.

A computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
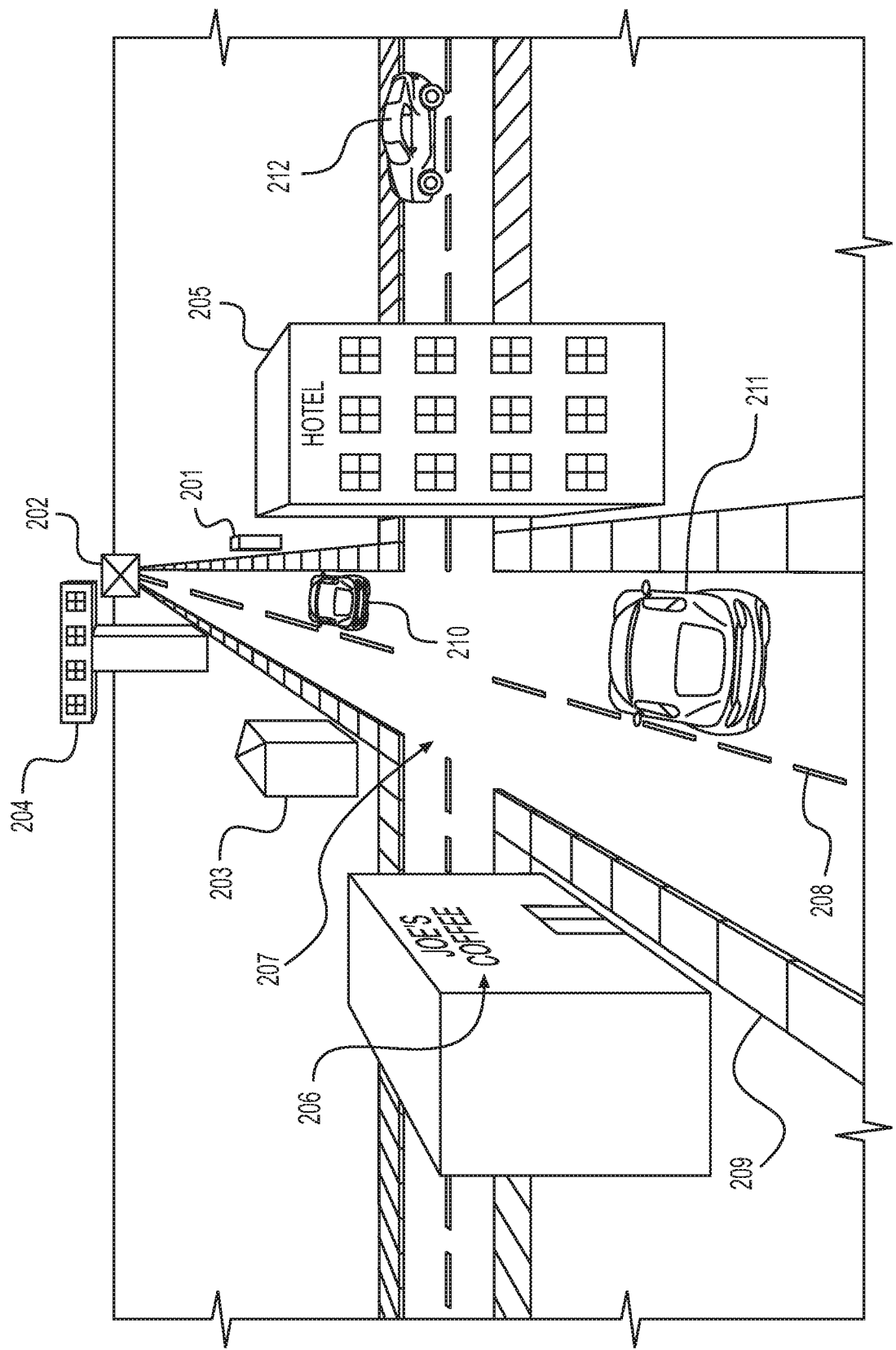
FIG. 2 shows an exemplary environment from which map data is generated, according to an aspect of the present disclosure.

FIG. 2 shows an exemplary environment from which map data is generated, according to an aspect of the present disclosure.

For an autonomous vehicle (AV) to operate properly, the AV determines its own position by relying on very detailed maps, such as high-definition (HD) maps, rather than on Global Positioning System (GPS) signals, to determine its location. The HD maps may collect various data with respect to a geographical environment to identify an AV's location and to perform operation of the AV. For example, the HD map may store information regarding particular intersections, mile markers along a roadway, median strips, cross walk signals, notable structures or buildings, commercial properties, sidewalks, traffic signs/lights, and the like to enable recognition of the AV's location on the HD map. The HD map may indicate a distance from an edge of the sidewalk to a median strip of an adjacent roadway, locations of cross walk signals, a pothole on the roadway, and the like. Although not limited thereto, the HD map may store information of an exemplary geographical environment illustrated in FIG. 2.

FIG. 2 includes an exemplary roadway environment in which potential change in map data may be detected. For example, a roadway may include a mile marker 201, a roadway blockade 202, a building 203, a site attraction 204, a hotel or lodging 205, a particular business 206, an intersection 207, a median strip 208, a sidewalk 209, a first AV 210, a second AV 211, and a third AV 212. However, aspects of the present disclosure are not limited thereto, such that additional buildings or features may be present to indicate a particular geographic area.

In an example, each of the first AV 210, the second AV 211, and the third AV 212 may be a first AV (FAV), an initial verification AV (IVAV), or a subsequent AV (SAV). FAV may be an AV that initially detects a potential change in existing map data. For example, the potential change may be blocking of a particular roadway and/or occurrence of a temporary detour near a construction site. Among other possible examples are a roadway being re-surfaced, curbstones being removed, objects at the side of the roadway being removed, change in business, a building, a monument being removed, and a wooden building door being replaced by a glass door.

IVAV may be an AV that participates in initial verification of the potential change reported by the FAV. SAV may be an AV that participates in subsequent verification of the potential change. Based on situations, a single AV may serve as either as a FAV, IVAV or SAV, but not for a same transaction. Further, certain qualifications may be required for certain AVs to be designated as a FAV, IVAV, or SAV. For example, at least because SAV generally provide subsequent or higher level verification of reported potential changes to map data, AVs may attain SAV status after attaining certain level of experience or going through a vetting process.

Further, an AV may include a plurality of AV sensors for capturing sensor data for comparison against a detailed data map or the HD map, and an AV HD map memory storage for storing and managing/updating of a HD map.

FIGS. 3A, 3B and 3C show exemplary configurations for which subsequent verification is performed with respect to initial verification, according to an aspect of the present disclosure.

FAV may first detect a potential change to map data based on sensor data. In an example, any AV may be a FAV. Based on the sensor data, the FAV may report the proposed change to the map data. The proposed change may be, for example, a temporary change (e.g., an event, a blockade, a construction site, a structural change to nearby roadways, buildings, sidewalks, or the like) or a more permanent change (e.g., opening a new roadway, building a new apartment complex, construction of a new commercial facility, demolition of an easy-to-find structure, and the like). The potential change data may be transmitted including information pertaining to the potential change to the map data and limited location identifying information. The location identifying information may include, without limitation, nearby building, business, mile marker, intersection, hotels, air ports and the like. Once the potential change is transmitted or uploaded to a server, nearby IVAVs may be alerted of the potential change to the map data. At this time, the IVAV may run at a low speed while running around the potential change. This allows the IVAV to increase the accuracy of initial verification of the potential change.

Once the proposed change is submitted, one or more IVAVs may perform initial verification for the proposed change to the map data. The one or more IVAVs may collect verification data using their sensors to verify the information pertaining to the potential change to the map data. The verification data may be similar in size to the potential change data to allow for quick verification of a potential change.

When a predetermined number of initial verifications or iterations of the initial verifications have been performed, a subsequent verification may be performed by one or more SAVs. The subsequent verification may be more extensive in its verification. Subsequent verification may be referred to as proof of work (PoW) block. PoW block may be a block of data that includes (i) data relating to the proposed change, and (ii) adjacent data, of magnitude such that the size of the PoW Block incurs a cost to either collect or transmit. It may be that a PoW block is very large, for example many gigabytes (Gb) of data and contains a relatively small potential change, for example a few megabytes (Mb). Subsequent verification or the PoW block may be successfully performed by one entity among many, and corresponding award may be provided to the entity that performed the subsequent verification. However, aspects of the present disclosure are not limited to the case that an award is given to only one entity that has performed the subsequent verification successfully.

The subsequent verification may collect subsequent verification information corresponding to the information pertaining to the potential change to the map data as well as adjacent data. For example, if the potential change to the map data spans 100 feet, the subsequent verification information may span 1,000 feet including the 100 feet of the potential change.

As illustrated in FIG. 3A, the potential change may be located near a middle region of the subsequent verification information. The initial verification (IV) information may span a small portion of a roadway including the potential change to the map data. For example, IV information may span a blockade blocking a particular roadway. The subsequent verification (SV) may span a portion of the roadway leading up to the blockade as well as a portion of the roadway leading away from the blockade for more extensive verification.

Alternatively, the potential change may be located near a beginning portion of the subsequent verification information as illustrated in FIG. 3B, or located near an ending portion of the subsequent verification information as illustrate din FIG. 3C. However, aspects of the present disclosure are not limited thereto, such that the potential change may overlap the verification information at varying portions.

Further, a length or amount of subsequent verification information may be varied according to a type of the potential change. For example, if the potential change is temporary in nature (e.g., a construction site), subsequent verification information required may be less than if it was being performed for a permanent structure. However, aspects of the present disclosure are not limited thereto, such that amount of subsequent verification information may be set to be the same.

Similarly, users of the updated map data may be charged for its access. For example, access to a number of Gb of map data may be purchased using virtual currency. Accordingly, a system may be self-sustaining, paid for by users seeking to access the updated map data.

Figure 4:
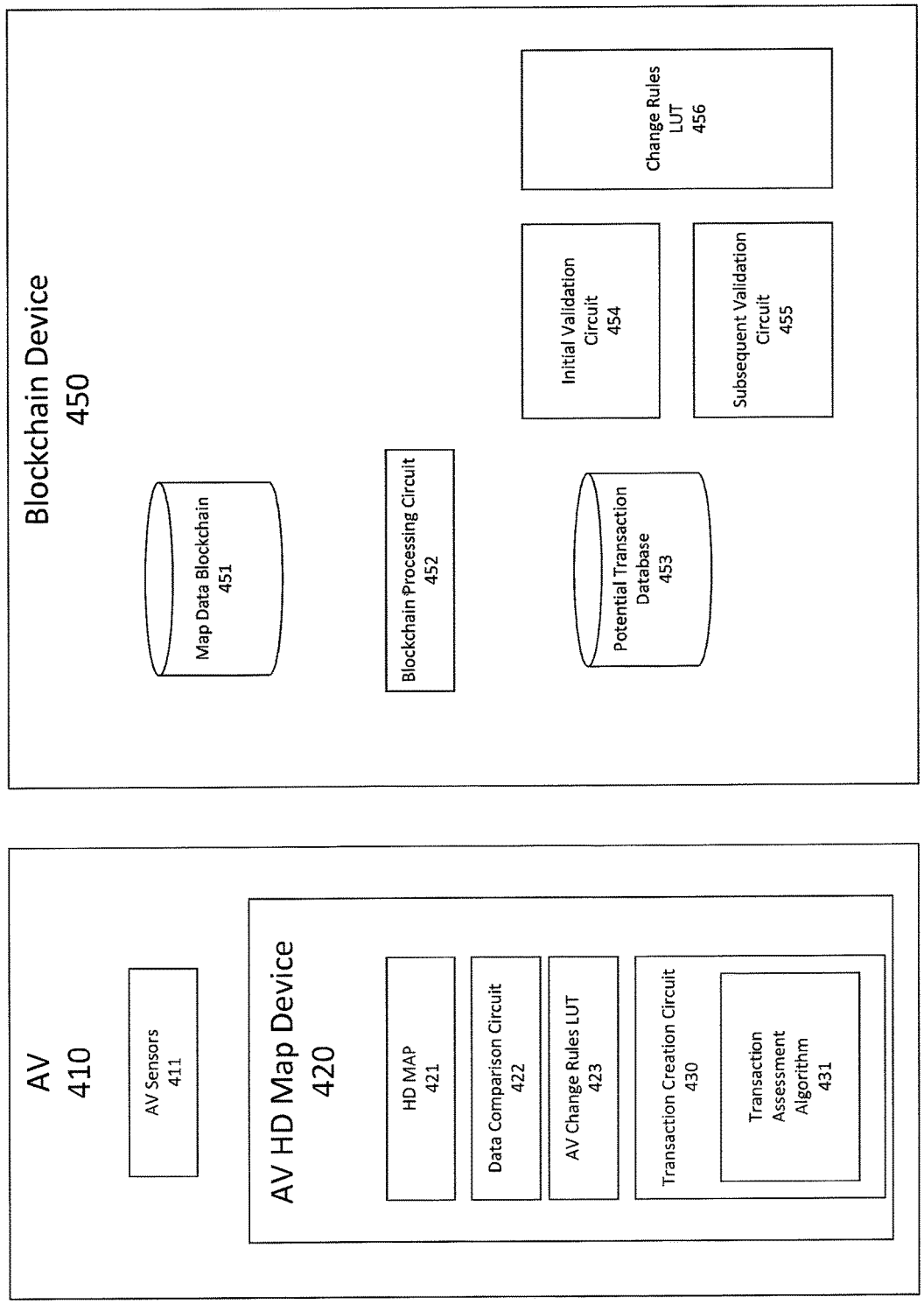
FIG. 4 shows an exemplary map control system, according to an aspect of the present disclosure.

FIG. 4 shows an exemplary map control system, according to an aspect of the present disclosure.

A blockchain map control system includes an autonomous vehicle (AV) 410 and a blockchain device 450. The AV 410 includes a plurality of AV sensors 411 for capturing sensor data for comparison against a detailed data map (e.g., HD map) and an AV HD Map device 420 for storing and managing/updating of a HD map. The AV 410 may transmit/receive data to/from the blockchain device 450 for validating and/or updating of map information. For example, data may be transmitted/received using Wi-Fi (registered trademark) or a Vehicle to Infrastructure technique.

Each AV participating in a map updating system may be identified either as a first AV (FAV), an initial verification AV (IVAV), or a subsequent AV (SAV). FAV may be an AV that initially detects a potential change in existing map data. For example, the potential change may be a particular change to a roadway (e.g., a pothole formed on the roadway or a steel plate), a change to a surrounding area (e.g. a structural change to a nearby easy-to find building or commercial facility), or blockades, and presence of blockades or a detour provided near a construction site. IVAV may be an AV that participates in initial verification of the potential change reported by the FAV. SAV may be an AV that participates in subsequent verification of the potential change. Based on situations, a single AV may serve as either as a FAV, IVAV or SAV, but not for a same transaction. Further, certain qualifications may be required for certain AVs to be designated as a FAV, IVAV, or SAV. For example, at least because SAV generally provide subsequent or higher level verification of reported potential changes to map data, AVs may attain SAV status after attaining certain level of experience or going through a vetting process.

For an AV to operate properly, AV relies on very detailed maps rather than on GPS signals. These detailed maps may sometimes be referred to as HD maps. HD maps for an autonomous vehicle may be managed an AV HD map device 420. The AV HD Map device 420 includes a HD map 421, a data comparison circuit 422, an AV change rules look up table (LUT) 423, and a transaction creation circuit 430. The transaction creation circuit 430 includes a transaction assessment algorithm 431 or a memory storing the transaction assessment algorithm 431.

The HD map 421 may be memory storage for storing of map information. Map information may include, without limitation, building information, roadway markers, business names, shapes of roadways and surrounding environment, heights of surrounding buildings and the like. The HD map 421 may be used to ascertain the AV's precise location. The data is stored in the HD Map is obtained from the map data blockchain, and may be a full version, or partial version of that data. As the HD map data comes from the map data blockchain the level of verification the data has undergone can be ascertained.

The data comparison circuit 422 may be a processor or a processing circuit that is capable of comparing sensor data acquired by the AV sensors with map data stored in the HD map 421 to determine whether a match exists. Various tolerances and correlations may be used, such that even if the data is not an exact match, a level of confidence can be achieved that the data relates to the same external objects.

The AV change LUT 423 may be a memory storage that contains rules and protocols that govern whether the AV should create a transaction.

The transaction creation circuit 430 may be a computer that is capable of creating transactions in a format to be used in the map data blockchain. The transaction assessment algorithm 431 is an algorithm executed for assessing the validity of a transaction and/or whether the transaction matches various criteria specified in the AV change LUT 423.

In view of these HD maps, an AV may obtain sensor data through various sensors 411 provided on the AV and compare the obtained sensor data against data included in the HD Maps to determine a location of the AV. In an example, the AV sensors 411 may include, without limitations, cameras, a LIDAR (actuators, a light detection and ranging) system, a sonar system, a radar system, acoustic sensors, infrared sensors, proximity sensors, a GNSS (Global Navigation Satellite System), and the like. In an example, data collected by AV sensors may be referred to as sensor data, and data collected in response to a verification request may be referred to as verification sensor data. The sensor data may be collected and temporarily stored for uploading, whereas the verification sensor data may be collected to verify against provided potential change data.

The HD maps refer to more than a description of roadways and roadway directions, and they may also include descriptions of buildings that have structures that are easy to find with respect to the roadways to facilitate determination of a particular location of the AV on the HD map, can be described (as part of the map), and later become identifiable marks.

The sensed data that is collected may include images from cameras, depth, or three-dimensional data from LIDAR and radar data systems or the like. The sensed data may relate to buildings to become marks such as objects at the side of the roadway (e.g., buildings) or buildings such as bridges or any other objects that have fixed locations and can be used as marks. For example, certain businesses or monuments may be identified as buildings to become marks. However, the aspects of the present disclosure are not limited thereto, such that stationary objects that have been determined to be present for a predetermined period of time may be identified as a landmark object for purposes of navigation. Further, some systems also may use the roadway itself, using image sensors below the vehicle that capture images of the roadway and use them as key identifiers or fingerprints to identify a location.

The blockchain device 450 includes a map data blockchain 451, a blockchain processing circuit 452, a potential transaction database 453, an initial validation circuit 454, a subsequent validation circuit 455, and a change rules LUT 456.

In an example, the blockchain device 450 may be capable of querying the map data blockchain 451 to gather information regarding a particular change, and then execute a set of assessments to determine whether the particular change can be trusted or meets a certain criteria.

In addition, the blockchain device 450 may provide AV users or AV operators with relevant data to allow the AV to determine whether the AV should adopt the change or use the previous version of the map data. Criteria that are used in such assessment may include, for example:
  a. An assessment of the AVs, AV users, or AV operators that have provided data relating to the change, and/or
  b. The amount of verification that has taken place, e.g. the amount of redundancy used during the Initial Verification, or the number of subsequent verifications that have taken place.

However, aspects of the present application are not limited thereto, such that additional criteria may be considered or used. Further, different AV users/operators may choose to have different criteria before new data is trusted. For example, vehicles carrying people or valuable cargo may require more extensive verification before a change is trusted or relied upon.

Generally, a blockchain is a distributed database that stores a set of records organized into blocks. Each block is timestamped and linked to previous blocks via a method that is resistant to the modification of previous blocks.

Blockchains may be decentralized, peer-to-peer networked databases that may be configured to store and authenticate a ledger of data and data transactions. The blockchain technology may facilitate transactions without a third-party intermediary, which may be instead validated by consensus. As new blocks are added the difficulty to modify previous blocks increases, with the aim that, after several new blocks have been added, it will become unjustifiable to do so, even for malicious purposes. Hence, if designed well, even though no central authority manages the blockchain, the validity of data can be trusted by all, as it becomes impractical to modify it for malicious purposes, hence it becomes irrefutable. This contrasts with traditional centralized servers or databases, where change processes often exist in order to control changes within the database, but if those processes are either followed or bypassed the data may be changed in an undetectable manner.

An important aspect of a blockchain system is the method by which new transactions are added to the database. Such processes are referred to as consensus mechanisms, as they are the way that users of the system agree whether a transaction should be added or not. Many systems, including Bitcoin, use a Proof-of-Work (PoW) mechanism. Here, a cost may be associated with adding a new transaction to the blockchain. The aim is to make it prohibitively expensive to fully control the changes to the blockchain, such that it does not make sense to haphazardly attempt to do so. Within the Bitcoin blockchain, a mathematical calculation is associated with the addition of new dat. The calculations or algorithms used may be specifically designed such that only one participant will we awarded with the ability to add the new data, and possibly gain a reward. The algorithm provided may provide for a solution to a problem to be difficult to find or obtain, but allows for easy verification of the solution by others.

The cost of performing the PoW may be the expense of computing power required or data expended in performing the mathematical calculations (i.e. the energy required to power the computers used to perform the calculations). As many participants may attempt to win the reward, only by owning the majority of computing power, which may be an increasingly expensive endeavour as the system becomes larger, can an entity be likely to have enough successive victories or subsequent verifications to make enough successive changes to the blockchain to effectively control it.

It should be noted that in many respects, such a PoW may be extremely wasteful, such that energy expended may serve as a punishment to deter entities from trying to inappropriately control the blockchain.

A blockchain is effectively a database of transactions, where the transactions are signed (e.g. 'approved') using a public key. According to aspects of the present disclosure, various transactions may be created and signed by different units, circuits, or components within the system. Hence a record can be kept of, for example, which AVs participated in the various parts of the process.

The map data blockchain 451 may be a database or memory storing data that can be used to provide a HD map.

The blockchain processing circuit 432 may be a processor or a processing circuit that is capable of processing of change to map data, initial verification sensor data, and subsequent verification sensor data.

The potential transaction database 433 may be a database or memory storing transactions that have been proposed to be added to the map data blockchain. Whilst in this database the transactions are assessed, and if the system determines them to be valid they are then added to the map data blockchain.

The initial validation circuit 434 may be a processing circuit that manages the initial verification of proposed changes to the map data blockchain. For example, the initial validation circuit 434 may receive potential change transactions from the potential transaction database 433, and transmit initial verification transactions. Further, the initial validation circuit 434 may receive initial verification rules from the change rules LUT 456 for performing initial verification transactions.

The subsequent validation circuit 435 may be a processing circuit that manages the subsequent verification of proposed changes to the map data blockchain. For example, the subsequent validation circuit 435 may receive subsequent verification transactions from potential transaction database 433. Further, the subsequent validation circuit 435 may receive subsequent verification rules from the change rules LUT 456 for performing subsequent verification transactions.

The change rules LUT 456 may be a database or memory contains rules and protocols that govern whether an initial validation or subsequent validation can be considered to be valid. For example, the stored rules and/or protocols for performing initial validation or subsequent validation may be stored and transmitted to either of the initial validation circuit or the subsequent validation circuit for performing initial validation processing or subsequent validation processing, respectively.

The blockchain device 450 may be realized in a distributed manner, so long as communication exists between the various devices it can be considered a single device or unit. However, aspects of the present disclosure are not limited to the above noted exemplary embodiment, such that even the devices or units may be distributed over multiple sub-units, or repeated across multiple instances, with any of the instances taking the role of the device. In an example, components of the blockchain device 450 may even be distributed across autonomous vehicles.

For example, the map data blockchain 451 may itself is likely to be a distributed database, with several copies existing at any one time, and with the different versions of the database being managed using standard blockchain processes.

Figure 5:
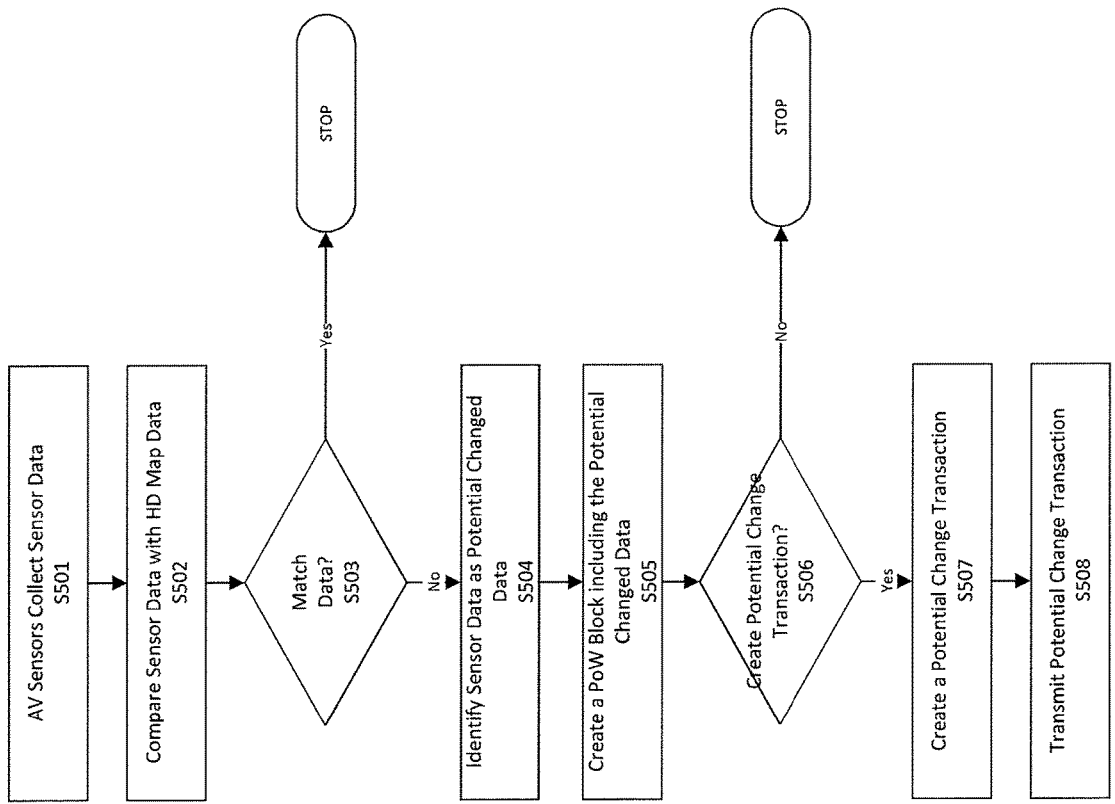
FIG. 5 shows an exemplary process flow for initiating a potential change process, according to an aspect of the present disclosure.

FIG. 5 shows an exemplary process flow for initiating a potential change process, according to an aspect of the present disclosure.

A creation of a potential change process may be a process where changes to the HD Map are discovered by a FAV, and a blockchain transaction (e.g., potential change transaction) is created and submitted to the blockchain's potential change database.

In operation 501, a FAV travels along a route and its sensors collect sensor data. In an example, the AV sensors may collect data at predetermined intervals. Once a potential change is identified, the AV sensors may continuously collect sensor data until the potential change is no longer detected. Alternatively, the AV sensors may collect sensor data continuously in real time.

The sensor data may collect information surrounding the AV. For example, the sensor data may collect information relating to the roadway the FAV is on as well as surrounding buildings, buildings to become marks, mile markers and the like. The sensor data may also collect information on people and other objects near its travel path and may be used in operation of the FAV. For example, the collected sensor data may be used to help guide the AV, such that the AV does not collide with objects.

In operation 502, the collected sensor data is compared to data stored in the HD map. More specifically, the sensor data is compared to the HD map to detect an event where the Sensor Data does not match the data stored in the HD Map.

In operation 503, a determination of whether the sensor data matches the data in the HD map is made. In an example, such determination may take into account various tolerances, such that changes within a predetermined threshold may be allowed, whereas variations outside of that threshold may be identified as changed data. Further, these tolerances may take into account various environmental conditions, such as weather conditions. For example, sensor data collected during rain may be compared against with data of the HD map similarly collected during rain. In certain conditions (e.g., during snow or sleet), the AV sensors may opt from collecting data where misinformation may be collected. Example environmental conditions are weather, daytime/night, a time, a season, and a country.

When it is determined that the sensor data matches with the data stored in the HD map, no further action is taken. Alternatively, when it is determined that the sensor data does not match with the data stored in the HD map, the sensor data is identified as potential changed data in operation S504.

In operation 505, a PoW block including the potential changed data is created or generated. The PoW block may further include other surrounding data such that total amount of data of the surrounding data and the potential changed data equals data amount required of the PoW block.

In operation 506, a determination of whether to create a potential change transaction for the PoW block is made. In an example, a transaction assessment algorithm stored in the traction creation circuit may be utilized to make this determination. The transaction assessment algorithm may consider several factors in making the determination of whether to create the potential change transaction. More specifically, factors that the transaction assessment algorithm take into account may include, without limitation, (1) AV participation, (2) validity of the change, and (3) PoW block criteria.

AV participation may specify whether the AV owner/operator wants the AV to participate. More specifically, whether a participation policy has been implemented by the AV's user or owner. For example, a preference setting in the AV Change Rules LUT may be configured to specify whether the AV should submit a potential change transaction or not. Further, the preference setting may also specify conditions for which the potential change transaction is to be submitted. For example, preference setting may specify that the potential change transaction is to be submitted for data or distance captured is below a predetermined threshold. In another example, a variable level of reward may be offered in exchange for submitting such a transaction, and the transaction assessment algorithm may assess whether this level of reward is deemed to be acceptable or not.

Validity of the change may specify whether a change is valid. More specifically, whether the potential changed data meets predetermined criteria. For example, if the AV sensors detect a change that is caused by a moving object, the transaction assessment algorithm may decide the change has been caused by a transient object, and therefore is only temporary.

PoW block criteria may specify whether the PoW block meets a predetermined criteria of a PoW Block. For example, the submitted PoW block may be checked against a set of requirements. These requirements may include, for example, the amount of data within the PoW Block, or the resolution of the data.

If it is determined that, in view of the above noted factors, the potential change transaction is not created in operation S506, no further action is taken. Alternatively, if it is determined that the potential transaction is to be created, a potential change transaction is created or generated for validation. In an example, the potential change transaction may contain at a minimum the sensor data relating to the potential change. Further, the potential change transaction may also contain other information, for example:

a. Other sensor data relating to environmental conditions,
    b. Data relating to type of sensors used as AV sensors,
    c. Data relating to the AV, and/or
    d. Data relating to the owners or users of the AV.

In operation S508, the potential change transaction is then signed by the FAV and sent to the transaction database for validation or verification.

Figure 6:
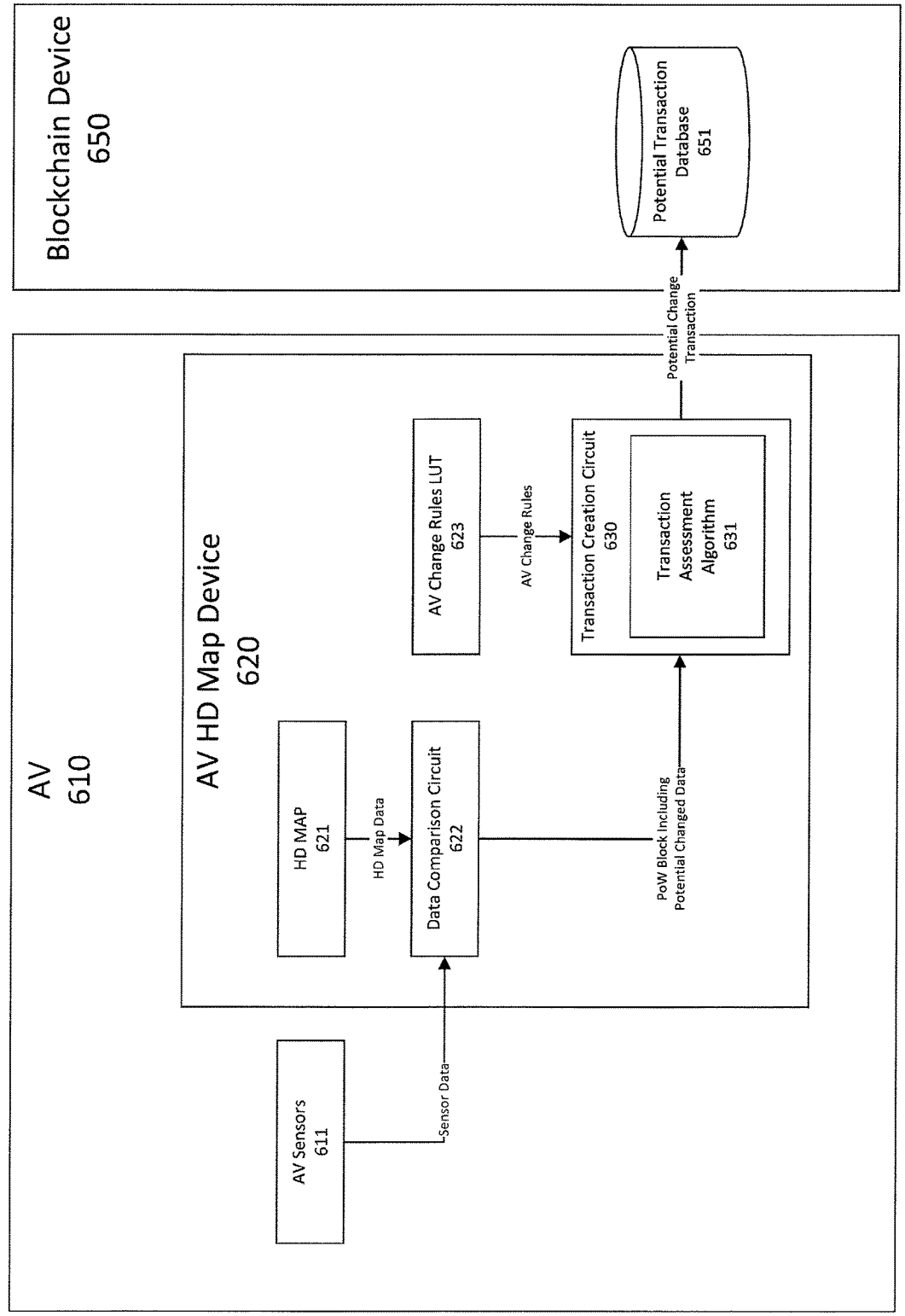
FIG. 6 shows an exemplary data process flow for initiating a potential change process, according to an aspect of the present disclosure.

FIG. 6 shows an exemplary data process flow for initiating a potential change process, according to an aspect of the present disclosure.

A blockchain map control system includes an autonomous vehicle (AV) 610 and a blockchain device 650. The AV 610 may be a FAV. The AV 610 includes a plurality of AV sensors 611 for capturing sensor data for comparison against a detailed data map (e.g., HD map) and an AV HD Map device 620 for storing and managing/updating of a HD map. The AV 610 may transmit/receive data to/from the blockchain device 650 for validating and/or updating of map information.

AV sensors 611 of AV 610 collect and transmit sensor data to the data comparison circuit 622. The HD map 621 also provides, to the data comparison circuit 622, corresponding data for comparison. In an example, the HD map 621 may provide the comparison data in response to a request from the data comparison circuit 622. Further, the data comparison circuit 622 may request the HD map 621 to provide comparison data that may have been collected under similar conditions. For example, if the sensor data being collected for comparison is collected during rain or in the evening time frame, comparison data collected under similar circumstances may be provided.

The data comparison circuit 622 in receipt of both the sensor data transmitted by the AV sensors 611 and the HD map data from HD map 621, compares the two sets of data to determine whether any changes are detected. In an example, the data comparison circuit 622 may be configured to detect changes above a predetermined threshold to determine whether a potential change in map data (or potential changed data) is detected.

When the data comparison circuit 622 determines that the sensed data includes potential change in the map data, a PoW block is created and transmitted to a transaction creation circuit 630. The PoW block includes the potential changed data for validation.

The transaction creation circuit 630 receives the PoW block from the data comparison circuit 622, and also receives AV change rules from the AV change rules LUT 623. The transaction assessment algorithm 631, determines in view of the received PoW block and the AV change rules, whether a potential change transaction is to be created. Further, the transaction assessment algorithm 631 may determine whether the potential change transaction is to be created in view of other factors, such as AV participation, validity of the change, and PoW block criteria.

Once the transaction creation circuit 630, using the transaction assessment algorithm 631, determines that the potential change transaction is to be created, the transaction creation circuit 630 creates and transmits the potential change transaction to the potential transaction database 651.

The potential transaction database 651 may be provided within a blockchain device 650. The potential transaction database 651 may store one or more potential change transactions for validation. Although the blockchain device 650 illustrates only the potential transaction database 651 as being included, aspects of the present disclosure are not limited thereto, such that other circuits and databases may also be present.

Figure 7A:
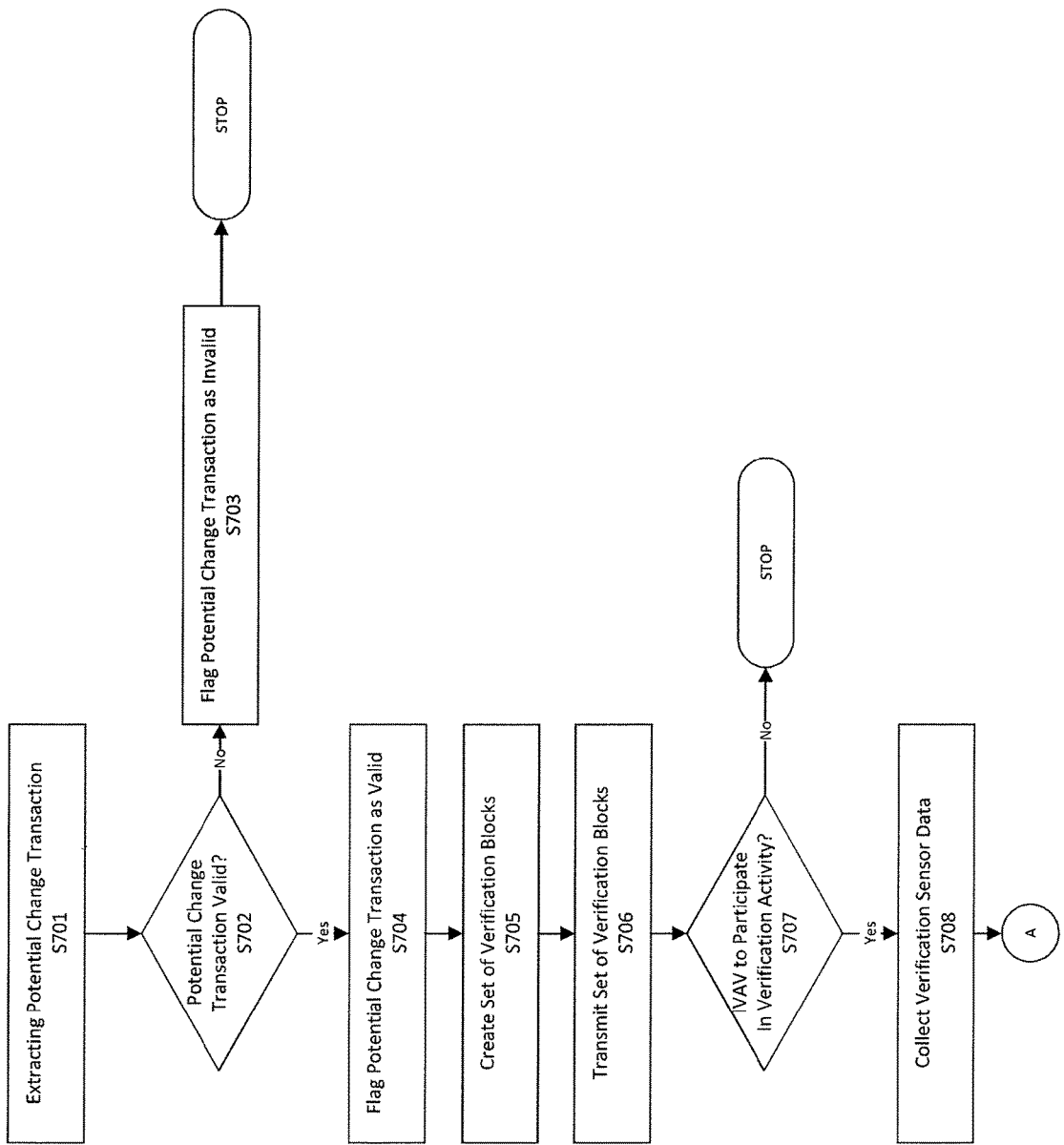
FIGS. 7A-7B show an exemplary process for performing an initial verification process, according to an aspect of the present disclosure.
Figure 7B:
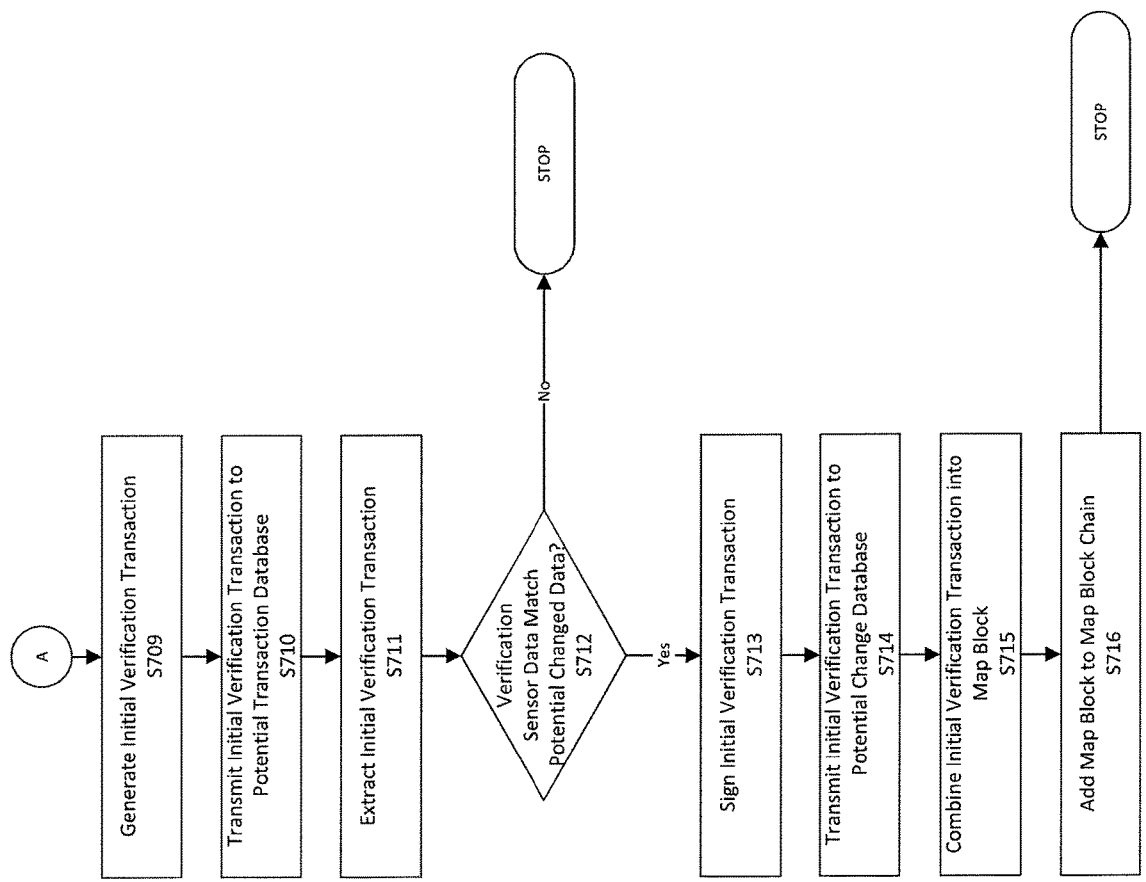

FIGS. 7A-7B show an exemplary process for performing an initial verification process, according to an aspect of the present disclosure.

In operation 701, a potential change transaction is extracted from the potential transaction database. The potential change transaction may be extracted the initial verification circuit.

In operation 702, various validation checks may be performed to check the potential change transaction, and the potential changed data stored therein, meet predetermined criteria to qualify the potential change transaction as a valid transaction. Such checks may include, for example:
  a. Checks that ensure the AV Sensors are of a type with sufficient capability to make the measurements.
  b. Checks to ensure whether or not the environmental conditions are such that they temporarily change the Sensed Data, meaning that the Potential Change is temporary and valid only for those environmental conditions.
  c. Checks that the AV, user of the AV or owner of the AV are not blacklisted.

If the potential change transaction is determined to be an invalid transaction, the potential change transaction is flagged as being invalid in operation S703 and the process ends. Alternatively, if the potential change transaction is determined to be a valid transaction, the potential change transaction is flagged as being valid in operation S704.

Once the potential change transaction is flagged as being valid in operation S704, a set of verification blocks are created in operation S705. In an example, each verification block may be associated with a section of the potential changed data. A number of verification blocks may be determined based on one or more factors, exemplarily including:
  a. A size of the potential changed data to be validated,
  a. The number of IVAVs that are available to check the verification blocks, and
  b. Whether redundancy is required in the check (i.e. whether one or multiple IVAVs are required to check a single block).

Whether redundancy is required in the check may depend on what the potential change is. For example, the number of IVAVs may be changed depending on whether the potential change is a surface of a roadway, a building near the roadway, a traffic sign, or something else.

Where the reliability of past checks relating to IVAVs is high, part relating to plural ones of IVAVs that are necessary for the check has already been checked.

Each verification block may specify an area corresponding to a portion of the potential changed data. Further, each of the verification blocks may specify AV sensors of an IVAV to collect sensor data for the specified area.

The initial verification circuit may determine a number of IVAVs that can collect the sensor data specified by the verification block. More specifically, the initial verification circuit may determine an amount of required initial validation sensor data, and a number of IVAVs that may be required to collect the required initial validation sensor data for initial validation. Availability of the IVAVs for participation may be determined by:
  a. Referring to a database storing data of the future location of AVs (by, for example knowing an AVs current location, and route—thus being able to know what locations the AV will pass in the future), and/or
  b. Broadcasting a set of locations and asking for AVs to reply if they wish to participate.

Further, the IVAVs selected for participation in the initial verification may be selected according to predetermined criteria or based on response time to the request for participation. For example, predetermined criteria may be specified in order to ensure that a single entity cannot control the verification. The predetermined criteria may specify a limitation of participation, and a time limit in which the initial verification is to be performed.

More specifically, participation in a group of a single AV owner, or AV type may be limited. For example, perhaps only 10% of the IVAVs may be allowed to be owned by a single company, or be providing a certain service (e.g., taxi companies or ride sharing services). For example, a company X may offer an autonomous vehicle taxi service, where various owners register their vehicles to participate in the service—and in this case a limit of 10% of the IVAVs may be allowed to be registered to provide company X's service.

Further, verification of the verification block may be specified to be performed within a certain time limit. Accordingly, only vehicles located within a proximate location of the area including the potential changed data may be eligible for participation. Such criteria may apply a certain level of randomness in the verification process, as no time is provided for AVs to be moved proactively to the location including the potential changed data for verification, and only vehicles that happen to be passing may participate. In an example, proximity of the vehicles may change based on a number of vehicles present.

In operation S706, the details of the verification blocks (i.e. the location where data should be collected, and also the type of data to collect) are sent to the selected IVAVs.

In operation S707, the selected IVAVs receiving the verification blocks may individually decide whether they wish to take part in the verification exercise or not. If a selected IVAV determines not to participates, the validation process ends for the respective IVAV. Alternatively, if the IVAV determines to participate in the verification activity, the IVAV may be assigned a verification block, which may direct the IVAV to collect verification sensor data using its AV sensors for an area corresponding to the verification block assigned to the IVAV, in operation S708.

In operation 709, the verification sensor data is transmitted to the transaction creation circuit, which then creates or generates an initial verification transaction.

In operation 710, the initial verification transaction is sent to the potential transaction database.

In operation 711, the initial validation circuit extracts the initial verification transaction from the potential transaction database. In operation 712, the verification sensor data is compared with the original potential changed data and determines whether a sufficient match or correspondence exists. In the determination of existence of sufficient match or correspondence, various tolerances may be considered. For example, higher tolerance may be provided on rainy days or in heavy traffic pattern during data collection. Further, the determination of sufficient match or correspondence may be made with various data being stored in the change rules LUT.

When it is determined that no sufficient match or correspondence exists between the initial verification sensor data and the potential changed data in operation S712, the process stops. Alternatively, if it is determined that sufficient match or correspondence exists between the initial verification sensor data and the potential changed data in operation S712, the process proceeds to operation S713.

In operation S713, initial validation circuit signs the initial verification transaction.

In operation 714, the signed initial verification transaction is sent to the potential transaction database for storage.

In operation 715, the blockchain processing circuit then extracts the initial verification transaction, and combines the initial verification transaction and other initial verification transactions provided by other IVAV into a map block. More specifically, the initial verification transactions corresponding to a number of verification blocks may be combined as a single map block corresponding to the potential changed data. However, aspects of the present application are not limited thereto, such that the blockchain processing circuit may convert the initial verification transaction to a map block, which may be combined after the conversion. Once the map block is created, it is added to a map data blockchain in accordance with predetermined map blockchain protocols. The map data blockchain may then be accessed by other AVs. Accordingly, a change in map data may be quickly updated and verified for immediate usage by AVs.

Further, AVs may specify a certain confidence level for the updated map data blockchain to be used. For example, an AV may specify that the updated map data blockchain can be accessed only after a certain number of redundant initial verifications have been performed. However, more conservative operators of the AVs may specify that updated data blockchain is to be accessed after a subsequent verification has been performed for the potential changed data.

Figure 8:
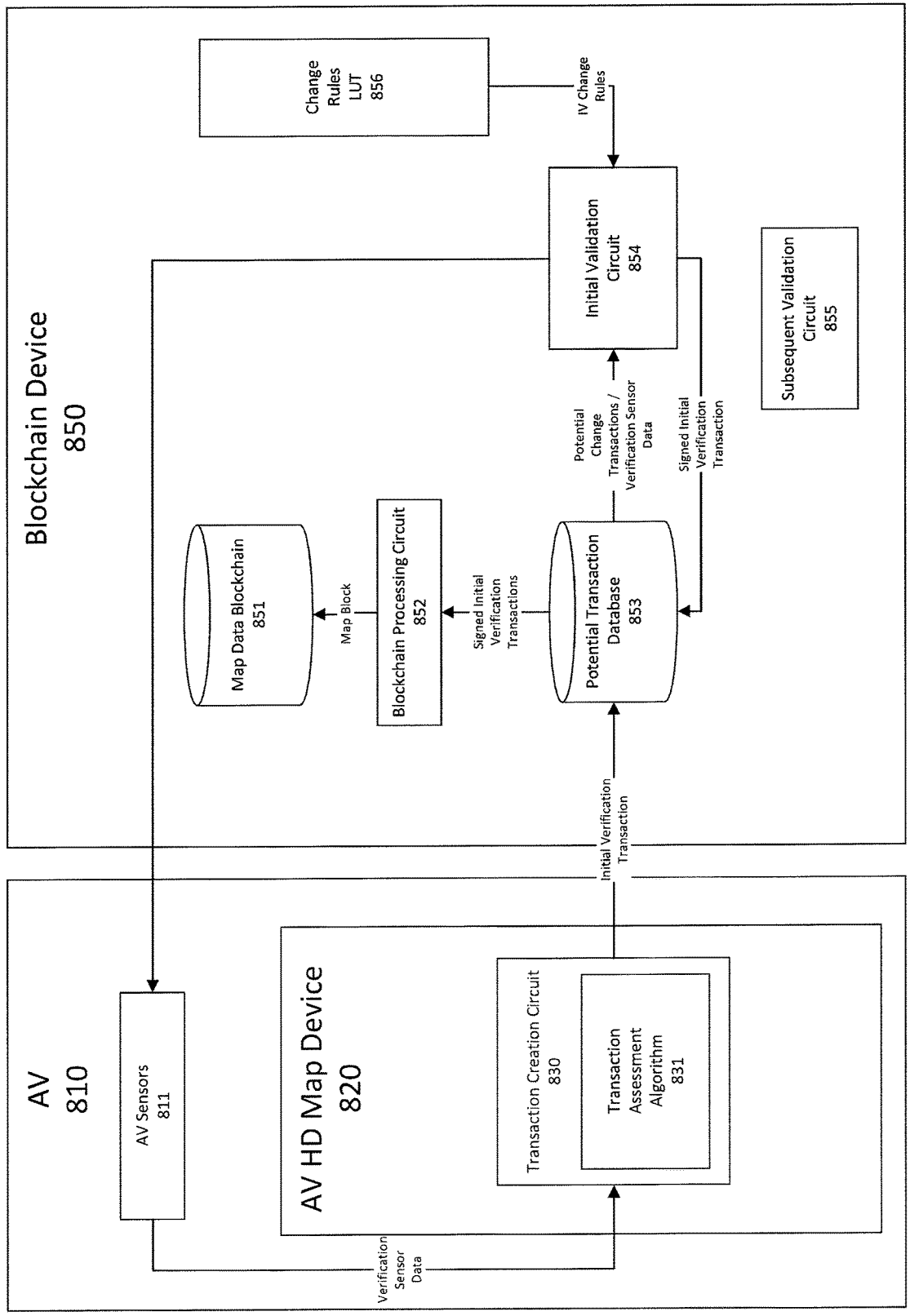
FIG. 8 shows an exemplary data process flow for performing an initial verification process, according to an aspect of the present disclosure.

FIG. 8 shows an exemplary data process flow for performing an initial verification process, according to an aspect of the present disclosure.

A blockchain map control system includes an autonomous vehicle (AV) 810 and a blockchain device 850. The AV 810 includes a plurality of AV sensors 811 for capturing sensor data, and a transaction creation circuit 830. The transaction creation circuit 830 includes a transaction assessment algorithm 831. Although the AV 810 illustrates only couple of components being included therein, aspects of the present disclosure are not limited thereto, such that other circuits and components may also be present.

Blockchain device 850 includes a map data blockchain 851, a blockchain processing circuit 852, a potential transaction database 853, an initial validation circuit 854, a subsequent validation circuit 855, and a change rules LUT 856.

AV sensors 811 of AV 810 collect and transmit initial verification sensor data to the transaction creation circuit 830. The AV 810 may be an IVAV.

The transaction creation circuit 830 receives the initial verification sensor data and creates an initial verification transaction. The initial verification transaction is then transmitted to the potential transaction database 853.

The initial validation circuit 854 then extracts the initial verification from the potential change database as well as the potential changed data, and compares the two sets of data to verify whether the initial verification data matches or corresponds with the potential changed data. If the initial validation circuit 854 determines that the two sets of data match or correspond within a predetermined tolerance, the initial validation circuit 854 signs the initial verification data and transmits the signed initial verification transaction to the potential transaction database 853.

The blockchain processing circuit 852 extracts and combines the signed initial verification transaction with other initial verification transactions transmitted by other IVAVs, and generates a map block. The map block is then transmitted to the map data blockchain 851 to be added to its map blockchain. The updated map blockchain may include initially validated potential changed data, which may be accessed by other AVs and be notified of the changed map data.

Figure 9A:
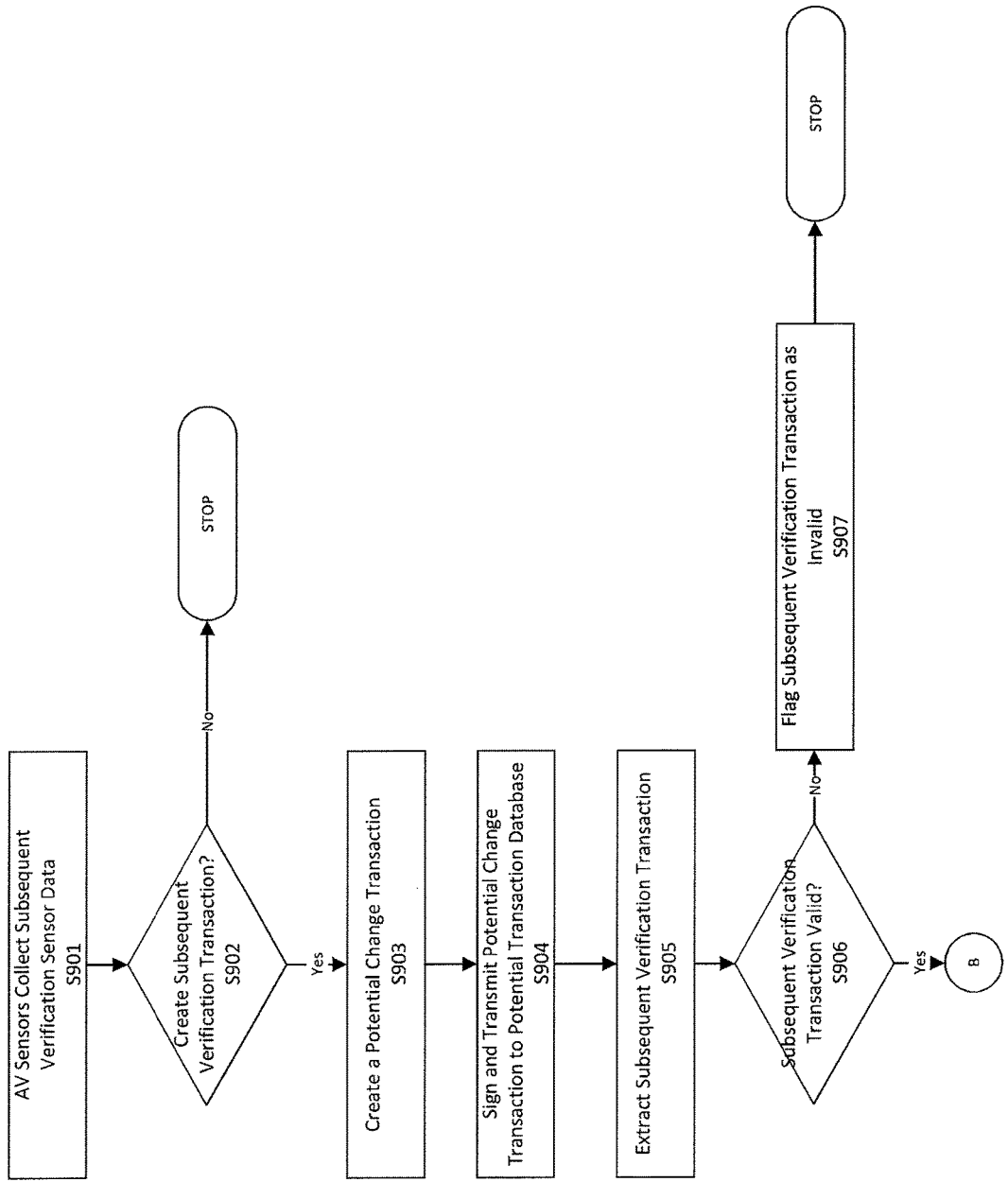
FIGS. 9A-9B show an exemplary process for performing a subsequent verification process, according to an aspect of the present disclosure.
Figure 9B:
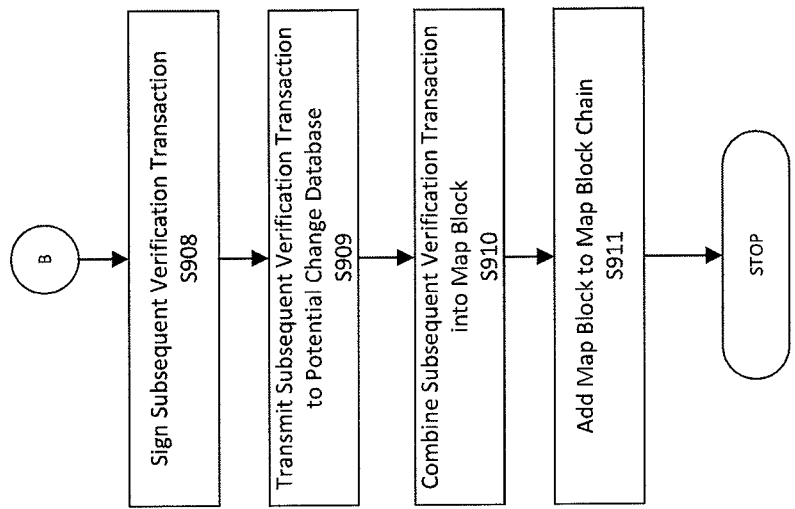

FIGS. 9A-9B show an exemplary process for performing a subsequent verification process, according to an aspect of the present disclosure.

Once the initial validation or verification has been performed, and the potential change transaction and/or initial verification transactions have been added to the map data blockchain, subsequent AVs (SAVs) are able to provide further validation by submitting PoW blocks that include the location and data type of the Potential Changed Data as well as adjacent PoW blocks.

In operation 901, an SAV is travelling along a route that contains the potentially changed data (e.g., a structural change to the roadway or surrounding areas), which has been initially validated or verified, and collects subsequent verification sensor data for performing subsequent validation or verification. The initial verification or validation of the potentially changed data may be either communicated to the SAV by an external system, or may be extracted from the SAV's HD Map, which may in turn takes map blocks including the initially verified data from the map data blockchain. The subsequent verification sensor data may collect data for an area at which the potential changed data was initially detected as well as adjacent areas. For example, if the potential changed data spans 30 feet, the subsequent verification sensor data may span an area located 100 feet prior to the area corresponding to the potential changed data. Further, the subsequent verification sensor data may also span an area located 100 feet after the area corresponding to the potential changed data.

In operation 902, the subsequent verification sensor data is sent to the transaction creation circuit of the SAV, which determines whether a subsequent verification transaction should be created. In an example, a determination of whether the subsequent verification transaction should be created includes one or more factors, including:

a. An assessment reflecting the AV owner's wishes about whether they wish the AV to participate or not, and/or
 b. An assessment as to whether the subsequent verification sensor data matches the requirements of the verification process or not.

However, aspects of the present application are not limited thereto, such that additional factors may be weighed in the determination.

If the subsequent verification transaction is determined not to be created in operation S902, the process ends. Alternatively, if the subsequent verification transaction is determined to be created in operation S902, the transaction creation circuit creates the transaction in operation S903.

In operation 904, the transaction creation circuit signs the subsequent verification transaction, and transmits the signed subsequent verification transaction to the potential transaction database.

In operation 905, the subsequent verification transaction including the subsequent verification sensor data is extracted from the potential transaction database for comparison. Further, in an example, the initially verified potential changed data may also be extracted from the potential transaction database for comparison. However, aspects of the present application are not limited thereto, such that the initially verified potential changed data as well as HD map data of areas surrounding an area corresponding to the potential changed data may be extracted from the HD map for comparison. Alternatively, the subsequent verification sensor data may be compared against a portion of initially verified map data blockchain corresponding to the subsequent verification sensor data.

Based on the comparison of the subsequent verification sensor data and the potential changed data, which may also include some data of adjacent areas, a determination of validity is rendered for the subsequent verification transaction in operation S906. The determination of validity may be rendered in view of subsequent verification rules provided by the change rules LUT.

In addition, the determination of validity may include, without limitation, considerations such as:
a. Assessments to ensure the SAV's AV Sensors are of the correct type to make the measurements, and/or
b. Assessments to ensure that a single, or small number of entities cannot control a change to the Map Data Blockchain.

Also, as with the potential change transaction, further checks are also made to ensure that the block of data qualifies as a PoW Block.

If the subsequent verification transaction is determined to be invalid in operation S906, the subsequent verification transaction is flagged as being invalid in operation S907, and the process ends. Alternatively, if the subsequent verification transaction is determined to be valid in operation S907, the subsequent validation circuit signs the subsequent verification transaction in operation 908. In operation S909, the subsequent validation circuit transmits the signed subsequent verification transaction to the potential transaction database.

In operation 910, the blockchain processing circuit then extracts the signed subsequent verification transaction from the potential transaction database, and combines it with other subsequent verification transaction(s), if available, into a map block. In operation S911, the blockchain processing circuit transmits the map block to the map data blockchain and adds the map block thereto in accordance to the map blockchain protocols.

Figure 10:
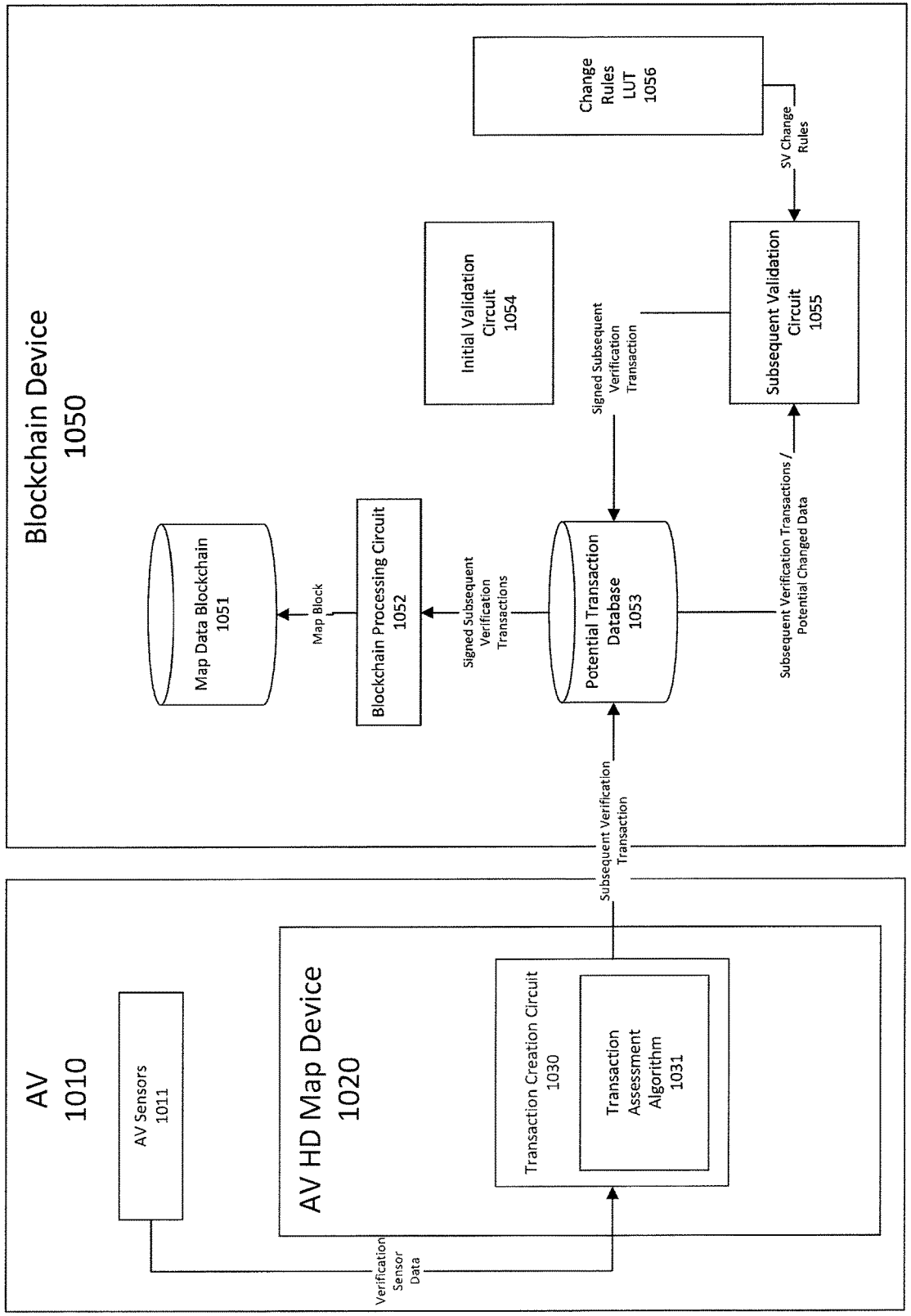
FIG. 10 shows an exemplary data process flow for performing a subsequent verification process, according to an aspect of the present disclosure.

FIG. 10 shows a data flow of a subsequent verification check, according to an aspect of the present disclosure.

A blockchain map control system includes an autonomous vehicle (AV) 1010 and a blockchain device 1050. The AV 1010 includes a plurality of AV sensors 1011 for capturing sensor data, and a transaction creation circuit 1030. The transaction creation circuit 1030 includes a transaction assessment algorithm 1031. Although the AV 1010 illustrates only couple of components being included therein, aspects of the present disclosure are not limited thereto, such that other circuits and components may also be present.

Blockchain device 1050 includes a map data blockchain 1051, a blockchain processing circuit 1052, a potential transaction database 1053, an initial validation circuit 1054, a subsequent validation circuit 1055, and a change rules LUT 1056.

AV sensors 1011 of AV 1010 collects and transmits initial verification sensor data to the transaction creation circuit 1030. The AV 1010 may be an SAV.

The transaction creation circuit 1030 receives the subsequent verification sensor data and creates a subsequent verification transaction, which includes the subsequent verification sensor data. The subsequent verification transaction is then transmitted to the potential transaction database 1053.

The subsequent validation circuit 1055 then extracts the subsequent verification transaction from the potential change database as well as the potential changed data, and compares the two sets of data to verify whether the initially verified or validated potential changed data is supported by the subsequent verification sensor data. For example, a determination may be made whether the potential changed data and HD map data of areas surrounding an area corresponding to the potential changed data match or correspond with the subsequent sensor data.

If the subsequent validation circuit 1055 determines that the initially verified potential changed data is supported by the subsequent verification sensor data within a predetermined tolerance, the subsequent validation circuit 1055 signs the subsequent verification data and transmits the signed subsequent verification transaction to the potential transaction database 1053.

The blockchain processing circuit 1052 extracts and combines the signed subsequent verification transaction with other subsequent verification transaction(s) transmitted by other SAVs, if applicable, and generates a map block. The map block is then transmitted to the map data blockchain 1051 to be added to its map blockchain. The updated map blockchain may include subsequently validated potential changed data, which may be accessed by other AVs and be notified of the changed map data.

Figure 11:
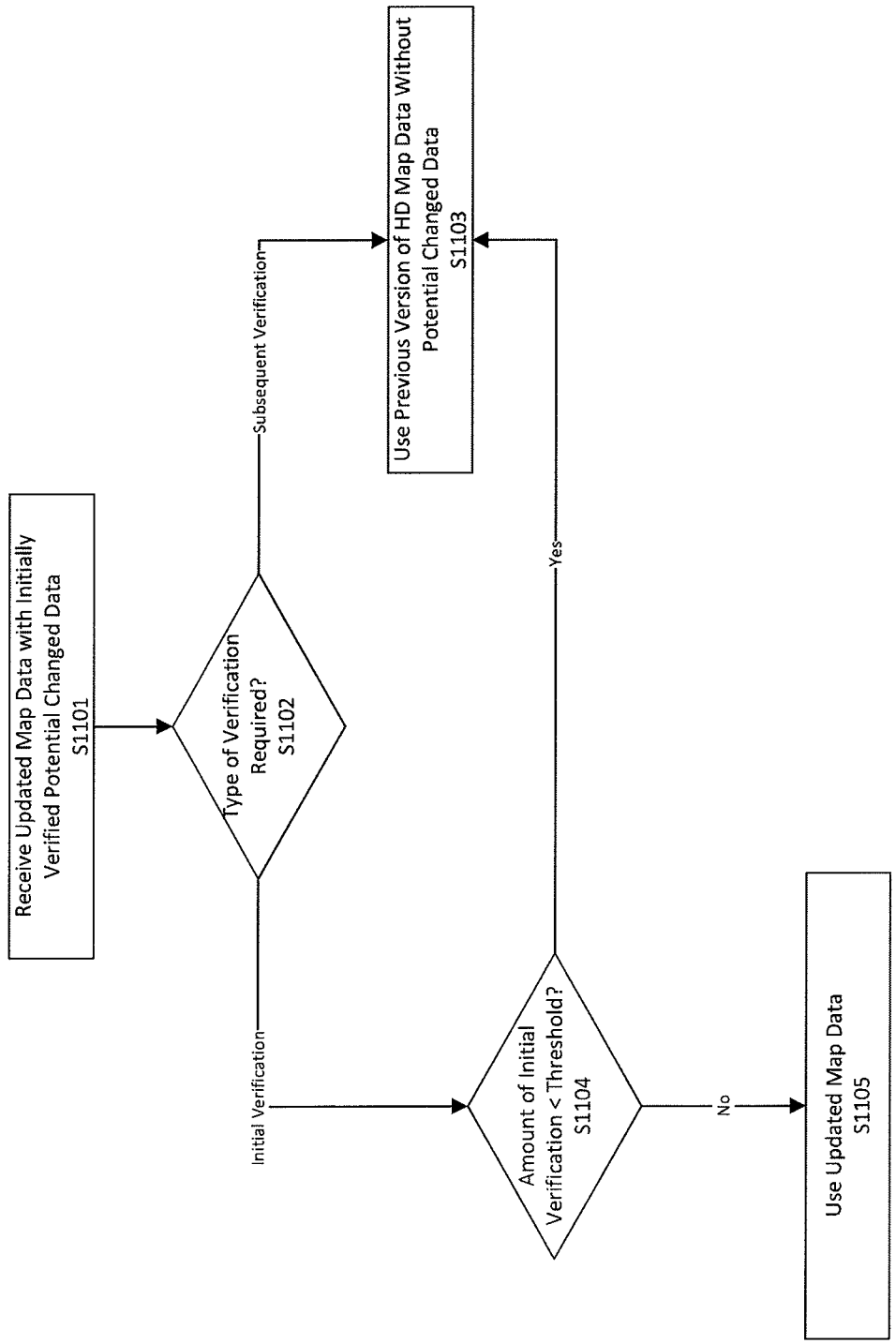
FIG. 11 shows an exemplary method for determining which version of map data to use, according to an aspect of the present disclosure.

FIG. 11 shows an exemplary method for determining which version of map data to use, according to an aspect of the present disclosure.

An AV may be configured to have different levels of trust or confidence based on verification performed on potential changed data. For example, a casual operator of an AV may rely on map data having initially verified potential changed data, whereas business travelers may prefer map data having multiple iterations of initial verification before relying on the updated map data. Further, passenger vehicles (e.g., bus) or vehicles carrying valuables (e.g., armored trucks) may require subsequent verification or validation before the updated map data is to be relied on.

In operation S1101, updated HD map data including initially verified or validated potential change data is received.

In operation S1102, a determination of verification type or level is made for an AV. For example, the verification type may be an initial verification or a subsequent verification.

If the verification type is determined to be the subsequent verification in operation S1102, previous version of the HD map data without the potential changed data is accessed in operation S1103. Alternatively, if the verification type is determined to be the initial verification, the method proceeds to operation S1104.

In operation S1104, a level of initial verification is determined. More specifically, a determination of whether an amount of initial verification performed on the potential changed data is less than a predetermined threshold set by the AV. For example, the AV may specify that the potential changed data must be initially verified at least 10 times before the updated map data is to be relied upon.

If the level of initial verification is determined to be less than the predetermined threshold, then the previous version of the HD map data without the potential changed data is accessed in operation S1103. Alternatively, if the level of initial verification is determined to be greater than or equal to the predetermined threshold, the updated HD map data including the potential changed data is accessed in operation S1105.

FIG. 12 shows an exemplary method for crediting an AV, according to an aspect of the present disclosure.

Once the potential change to the map data has been through the initial verification and subsequent verification, FAV, IVAV(s) and SAV(s) may be rewarded for their contribution to updating of the map data. In an example, operators of these vehicles may be rewarded in virtual currency, such as map coins, or in other forms of rewards, such as paid data usage or free access to HD map data. The amount of reward may be based on level of participation or amount of data expended in participating in the map data process. For example, since SAV(s) may be required to transmit the most amount of data among the above noted vehicles, SAV(s) may correspondingly be rewarded the most.

In operation S1201, a FAV submits a potential changed data. In operation S1202, a determination of whether the potential changed data has been initially verified is made. If the potential changed data submitted by the FAV is determined to be initially verified in operation S1202, the FAV submitting the potential changed data and an IVAV that performs the initial verification are credited with a reward in operation S1204. Alternatively, the potential changed data submitted by the FAV goes through an initial verification process but is rejected based on initial verification sensor data collected by the IVAV, the IVAV is credited in operation S1203 but not the FAV.

In operation S1205, a determination of whether the potential changed data that has been initially verified is subsequently verified is made. If the initially verified potential changed data is determined to be subsequently verified in operation S1205, the SAV performing the subsequent verification is credited with a reward in operation S1207. Further, the FAV and/or the IVAV may also receive additional credit of a reward upon a successful subsequent verification. Alternatively, if a subsequent verification operation is performed on the initially verified potential changed data but is unsuccessful in the subsequent verification, the SAV may be credited with a reward in operation S1206 but not the FAV or the IVAV.

Accordingly, in view of the above exemplary embodiments, a blockchain may be used for purposes of maintaining map data, and therefore allows the advantages of a blockchain, such as irrefutable data storage and distributed data storage, to be used to control the map data used by autonomous vehicles. Further, users may collectively maintain a map database in a way that allows changes to be quickly verified, and therefore immediately usable if needed, but in a way that protects users from a single, or small number, of participants from maliciously altering the map data such that subsequent AVs operate in a non-optimal way.

Further, aspects of the present application may allow users to verify changes to map data using a more arduous mechanism that in itself deters malicious users from altering the map data for bad intentions, and thus, how to allow the level of trust in the change of data to be increased over time as more users verify the initial change.

Further, additional advantages may be provided, including:
a. Changes in map data are quickly verified in a way that means it is difficult for a single malicious entity to make a spurious change,
b. Changes are the further verified such that an increased level of trust can be built over time. Again, this verification may be performed in way that includes deterrents and safeguards against a malicious entity controlling the verification,
c. Users are enabled to assess the change of data over time, and the associated levels of trust with each change, and decide which version of the data they wish to use, and/or
d. Users may be provided rewards in return for ongoing maintenance of the map data.

Aspects of the present disclosure also aims to store the map data used by AVs in a blockchain, and thus use the benefits of the blockchain, such as irrefutable data storage, and a distributed database architecture, which can then be used to store map data. Further, changes to that blockchain may be controlled in a way that may (i) allow changes to be updated quickly, which may be important as a change that may not be registered leading to an AV being unable to determine its position, and (ii) those changes to be further verified, and the trust in the changes to be subsequently increased over time.

Further, the method used to verify the changes may be designed to increase the difficulty/cost for a single entity to control the changes to the blockchain. Accordingly, changes that are made for malicious purposes are less likely (c.f. the PoW in the Bitcoin Blockchain). Such a method may include, without limitation, placing rules on the amount of participation in a change a single entity can have, introducing randomness in the performance of initial verification of the change, and making subsequent verifications arduous by embedding the verification in a 'PoW Block' of data that has an expense associated with its transfer to the blockchain.

Other aspects of the present disclosure include AVs gathering sensor data and comparing the sensor data to stored map data to determine their precise location. The map data may be used as the reference point during navigation, and stored in a blockchain. During an operation of an AV, a difference in the sensed data and stored data may be found. Such difference may be assumed to be a change in the structures (e.g., roadway, buildings etc.) that are being measured in order to calculate the AV's location. Optionally, some checks are made to ensure the change is persistent, and is not temporary due to a transient object, weather conditions and the like. Further, this change may then be rapidly verified by other vehicles using an initial verification. Optionally, checks may be additionally made to ensure that the vehicles participating in this initial verification cannot be overly controlled by a single entity. If the verification is successful, the change is recorded on the map data blockchain. Upon initial verification, one or more subsequent verifications may be then performed, with the performance of these verifications being more arduous than the initial verification. Subsequent verification may use a method that has a distinct cost to the entity providing the verification. Such cost may be designed to discourage a single entity from providing multiple verifications, and therefore controlling the perceived level of verification that has taken place. As with the initial verification manual checks may also be used to ensure the participation of a single entity is limited.

In view of the above noted disclosures, a way for vehicles to log potential changes to the map data, and have those changes rapidly verified, and then later subsequently verified in a more arduous manner (e.g., the use of arduous methods means that there is a disincentive to maliciously modify the map data) is provided. The initial verifications and subsequent arduous verifications are designed to incur a penalty to the participant, due to the amount of data that needs to be transferred as well as processing requirements. Such an approach may lead to an incurrence of significant cost if an entity decides to make a change and verify it many times. This is done purposefully to encourage multiple entities to participate in the verification process. Accordingly, such disclosure may allow checks to be used to reduce the ability of a single entity to change the map data.

Although the above disclosure is directed to the example in which the AV is equipped with the AV HD map device 420, the HD map device 420 may be provided in a device other than the AV, such as a server.

Although the above disclosure is directed to the example in which the vehicle is an AV, since autonomous driving need not be performed as long as sensor data can be acquired, the vehicle may be a vehicle driven by a driver as long as it is equipped with various sensors. The various sensors include, with no limitations, a variety of sensors like the above-described specific examples of the AV sensors.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a method is provided for updating map data for an autonomous vehicle (AV). The method includes collecting, using one or a plurality of AV sensors of a first AV, sensor data; comparing the sensor data collected against map data stored in a memory of the first AV; when a difference between the sensor data and the map data is above a predetermined threshold, determining that potential changed data is present in the sensor data; generating a proof of work (PoW) block including the potential changed data; generating a set of verification blocks for verification of the PoW block; collecting, using one or a plurality of AV sensors of a second AV, first verification sensor data; comparing the potential changed data with the first verification sensor data; and when the first verification sensor data corresponds to the potential changed data, determining that first verification of the potential changed data is successful, generating a first verified map block based on the first verification sensor data, and adding the first verified map block to a first verified map blockchain.

According to another aspect of the present disclosure, the map data is stored in the memory of the first AV.

According to another aspect of the present disclosure, the method further includes collecting, using one or a plurality of AV sensors of a third AV, second verification sensor data; comparing the second verification sensor data against both the map data and the first verification sensor data; when a portion of the second verification sensor data corresponds to the first verification sensor data and a remaining portion of the second verification sensor data corresponds to the map data, determining that second verification of the potential changed data is successful, generating a second verified map block based on the second verification sensor data, and adding the second verified map block to a map blockchain to provide a second verified map blockchain.

According to yet another aspect of the present disclosure, an amount of data of the second verification sensor data is larger than an amount of data of the first verification sensor data.

According to still another aspect of the present disclosure, the second verification sensor data includes sensor data corresponding to an area of the potential changed data and one or more adjacent areas.

According to another aspect of the present disclosure, an amount of data of the first verification sensor data is greater or equal to an amount of data of the potential changed data.

According to another aspect of the present disclosure, the first verification sensor data includes sensor data corresponding to an area of the potential changed data.

According to yet another aspect of the present disclosure, the first verified map blockchain is a distributed database.

According to still another aspect of the present disclosure, the distributed database is such that several copies exist in parallel in the form of various versions of the distributed database.

According to a further aspect of the present disclosure, the second verified map blockchain is a distributed database.

According to another aspect of the present disclosure, the method further includes determining to adopt, by an AV, the first verified map blockchain as its updated map data according to a confidence level set for the AV.

According to another aspect of the present disclosure, the confidence level set for the AV specifies that the first verification of the potential changed data is successfully performed at least a predetermined number of times before its adoption.

According to yet another aspect of the present disclosure, the one or plurality of AV sensors of the first AV and the second AV each includes: at least one image sensor, at least one LIDAR sensor, and at least one radar sensor.

According to still another aspect of the present disclosure, the generating of the PoW block expends data and processing resources of the first AV.

According to another aspect of the present disclosure, each of the first AV and the second AV receives credit upon the first verification of the potential changed data.

According to another aspect of the present disclosure, the credit is virtual currency.

According to yet another aspect of the present disclosure, a number of the verification blocks is determined based on at least one of: a size of the potential changed data, a number of second AVs available to perform the first verification, and whether redundancy is required for the first verification.

According to still another aspect of the present disclosure, the verification blocks include separate portions of the potential changed data.

According to another aspect of the present disclosure, the predetermined threshold is adjusted according to environmental conditions.

According to another aspect of the present disclosure, the environmental conditions are at least one of weather, daytime/night, a time, a season, and a country.

According to yet another aspect of the present disclosure, an AV is set to operate as only one of the first AV, second AV and third AV for verification of the potential changed data.

According to still another aspect of the present disclosure, the method includes selecting one or more second AVs for performing the initial verification based on proximity to an area corresponding to the potential changed data.

According to another aspect of the present disclosure, a non-transitory computer readable storage medium that stores a computer program, the computer program, when executed by a processor, causing a computer apparatus to perform a process for updating map data for an autonomous vehicle (AV) is disclosed. The process includes collecting, using one or a plurality of AV sensors of a first AV, sensor data; comparing the sensor data collected against map data stored in a memory of the first AV; when a difference between the sensor data and the map data is above a predetermined threshold, determining that potential changed data is present in the sensor data; generating a proof of work (PoW) block including the potential changed data; generating a set of verification blocks for verification of the PoW block; collecting, using one or a plurality of AV sensors of a second AV, first verification sensor data; comparing the potential changed data with the first verification sensor data; and when the first verification sensor data corresponds to the potential changed data, determining that first verification of the potential changed data is successful, generating a first verified map block based on the first verification sensor data, and adding the first verified map block to a first verified map blockchain.

According to another aspect of the present disclosure, the map data is stored in a memory of the first AV.

According to yet another aspect of the present disclosure, a computer apparatus for updating map data for an autonomous vehicle (AV) is provided. The computer apparatus includes a memory that stores instructions, and a processor that executes the instructions, in which, when executed by the processor, the instructions cause the processor to perform a set of operations. The set of operations includes collecting, using one or a plurality of AV sensors of a first AV, sensor data; comparing the sensor data collected against map data stored in a memory of the first AV; when a difference between the sensor data and the map data is above a predetermined threshold, determining that potential changed data is present in the sensor data; generating a proof of work (PoW) block including the potential changed data; generating a set of verification blocks for verification of the PoW block; collecting, using one or a plurality of AV sensors of a second AV, first verification sensor data; comparing the potential changed data with the first verification sensor data; and when the first verification sensor data corresponds to the potential changed data, determining that first verification of the potential changed data is successful, generating a first verified map block based on the first verification sensor data, and adding the first verified map block to a first verified map blockchain.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for updating map data for an autonomous vehicle (AV), the method comprising:
   collecting, using one or a plurality of AV sensors of a first AV, sensor data;
   comparing the sensor data collected against map data;
   when a difference between the sensor data and the map data is above a predetermined threshold, determining that potential changed data is present in the sensor data;
   generating a proof of work (PoW) block including the potential changed data;
   generating a set of verification blocks for verification of the PoW block;
   collecting, using one or a plurality of AV sensors of a second AV, first verification sensor data;
   comparing the potential changed data with the first verification sensor data; and
   when the first verification sensor data corresponds to the potential changed data, determining that first verification of the potential changed data is successful, generating a first verified map block based on the first verification sensor data, and adding the first verified map block to a first verified map blockchain.

2. The method of claim 1, wherein the map data is stored in a memory of the first AV.

3. The method of claim 1, further comprising:
collecting, using one or a plurality of AV sensors of a third AV, second verification sensor data;
comparing the second verification sensor data against both the map data and the first verification sensor data; and
when a portion of the second verification sensor data corresponds to the first verification sensor data and a remaining portion of the second verification sensor data corresponds to the map data,
determining that second verification of the potential changed data is successful,
generating a second verified map block based on the second verification sensor data, and
adding the second verified map block to a map blockchain to provide a second verified map blockchain.

4. The method of claim 3, wherein an amount of data of the second verification sensor data is larger than an amount of data of the first verification sensor data.

5. The method of claim 3, wherein the second verification sensor data includes sensor data corresponding to an area of the potential changed data and one or more adjacent areas.

6. The method of claim 3, wherein the second verified map blockchain is a distributed database.

7. The method of claim 3, wherein an AV is set to operate as only one of the first AV, second AV and third AV for verification of the potential changed data.

8. The method of claim 1, wherein an amount of data of the first verification sensor data is greater than or equal to an amount of data of the potential changed data.

9. The method of claim 1, wherein the first verification sensor data includes sensor data corresponding to an area of the potential changed data.

10. The method of claim 1, wherein the first verified map blockchain is a distributed database.

11. The method of claim 10, wherein the distributed database is provided with several copies existing at any one time and with different versions of the data base.

12. The method of claim 1, further comprising:
determining to adopt, by an AV, the first verified map blockchain as its updated map data according to a confidence level set for the AV.

13. The method of claim 12, wherein the confidence level set for the AV specifies that the first verification of the potential changed data is successfully performed at least a predetermined number of times before its adoption.

14. The method of claim 1, wherein the one or plurality of AV sensors of the first AV and the second AV each includes at least one image sensor.

15. The method of claim 1, wherein the one or plurality of sensors of each of the first AV and the second AV include at least one LIDAR (actuators, a light detection and ranging) sensor.

16. The method of claim 1, wherein the one or plurality of sensors of each of the first AV and the second AV include at least one radar sensor.

17. The method of claim 1, wherein the generating of the PoW block expends data and processing resources of the first AV.

18. The method of claim 1, wherein each of the first AV and the second AV receives credit upon the first verification of the potential changed data.

19. The method of claim 18, wherein the credit is virtual currency.

20. The method of claim 1, wherein a number of the verification blocks is determined based on at least one of:
a size of the potential changed data,
a number of second AVs available to perform the first verification, and
whether redundancy is required for the first verification.

21. The method of claim 1, wherein the verification blocks include separate portions of the potential changed data.

22. The method of claim 1, wherein the predetermined threshold is adjusted according to environmental conditions.

23. The method of claim 1, wherein the environmental conditions are at least one of weather, daytime/night, a time, a season, and a country.

24. The method of claim 1, further comprising:
selecting one or more second AVs for performing the first verification based on proximity to an area corresponding to the potential changed data.

25. A non-transitory computer readable storage medium that stores a computer program, the computer program, when executed by a processor, causing a computer apparatus to perform a process for updating map data for an autonomous vehicle (AV), the process comprising:
collecting, using one or a plurality of AV sensors of a first AV, sensor data;
comparing the sensor data collected against;
when a difference between the sensor data and the map data is above a predetermined threshold, determining that potential changed data is present in the sensor data;
generating a proof of work (PoW) block including the potential changed data;
generating a set of verification blocks for verification of the PoW block;
collecting, using one or a plurality of AV sensors of a second AV, first verification sensor data;
comparing the potential changed data with the first verification sensor data; and
when the first verification sensor data corresponds to the potential changed data, determining that first verification of the potential changed data is successful, generating a first verified map block based on the first verification sensor data, and
adding the first verified map block to a first verified map blockchain.

26. The non-transitory computer-readable storage medium of claim 25, wherein the map data is stored in a memory of the first AV.

27. A computer apparatus for updating map data for an autonomous vehicle (AV), the computer apparatus comprising:
a memory that stores instructions, and
a processor that executes the instructions,
wherein, when executed by the processor, the instructions cause the processor to perform operations comprising:
collecting, using one or a plurality of AV sensors of a first AV, sensor data;
comparing the sensor data collected against map data;
when a difference between the sensor data and the map data is above a predetermined threshold, determining that potential changed data is present in the sensor data;
generating a proof of work (PoW) block including the potential changed data;
generating a set of verification blocks for verification of the PoW block;
collecting, using one or a plurality of AV sensors of a second AV, first verification sensor data;

comparing the potential changed data with the first verification sensor data; and when the first verification sensor data corresponds to the potential changed data, determining that first verification of the potential changed data is successful, generating a first verified map block based on the first verification sensor data, and adding the first verified map block to a first verified map blockchain.

* * * * *